US008046466B2

(12) United States Patent
Sutou

(10) Patent No.: US 8,046,466 B2
(45) Date of Patent: Oct. 25, 2011

(54) SYSTEM AND METHOD FOR MANAGING RESOURCES

(75) Inventor: Hiromi Sutou, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 913 days.

(21) Appl. No.: 11/668,598

(22) Filed: Jan. 30, 2007

(65) Prior Publication Data

US 2008/0034093 A1 Feb. 7, 2008

(30) Foreign Application Priority Data

Aug. 1, 2006 (JP) ................................. 2006-209367

(51) Int. Cl.
 *G06F 15/173* (2006.01)
(52) U.S. Cl. ........ 709/226; 709/223; 709/224; 709/225; 713/300; 713/320; 713/323
(58) Field of Classification Search ........... 709/223–226
 See application file for complete search history.

(56) References Cited

U.S. PATENT DOCUMENTS

| 6,230,204 | B1 * | 5/2001 | Fleming, III .................. 709/229 |
| RE37,811 | E * | 7/2002 | Sitbon et al. ........................ 700/1 |
| 6,959,265 | B1 * | 10/2005 | Candela et al. ............... 702/186 |
| 7,020,713 | B1 * | 3/2006 | Shah et al. ..................... 709/235 |
| 7,146,353 | B2 * | 12/2006 | Garg et al. ............................. 1/1 |
| 7,174,379 | B2 * | 2/2007 | Agarwal et al. ............... 709/226 |
| 7,356,602 | B2 * | 4/2008 | Goldszmidt et al. .......... 709/229 |
| 7,461,149 | B2 * | 12/2008 | Gasca et al. ................... 709/226 |
| 7,499,968 | B1 * | 3/2009 | Alexander et al. ............ 709/203 |
| 7,512,947 | B2 * | 3/2009 | Moore .......................... 718/102 |
| 7,512,949 | B2 * | 3/2009 | Creamer et al. .............. 718/105 |
| 7,548,924 | B2 * | 6/2009 | Watanabe .............................. 1/1 |
| 7,565,656 | B2 * | 7/2009 | Yamasaki et al. ............. 718/104 |
| 7,574,424 | B2 * | 8/2009 | Chowdhuri ............................ 1/1 |
| 7,627,506 | B2 * | 12/2009 | Birkestrand et al. ........... 705/34 |
| 7,640,331 | B2 * | 12/2009 | Batra et al. .................... 709/223 |
| 7,787,492 | B2 * | 8/2010 | Timus et al. ................... 370/468 |
| 7,831,325 | B1 * | 11/2010 | Zhang et al. .................. 700/108 |
| 7,844,967 | B2 * | 11/2010 | Kelly ............................. 718/102 |
| 7,890,620 | B2 * | 2/2011 | Masuda et al. ................ 709/224 |
| 2002/0152305 | A1 * | 10/2002 | Jackson et al. ................ 709/224 |
| 2003/0036886 | A1 * | 2/2003 | Stone ............................. 702/188 |
| 2003/0135615 | A1 * | 7/2003 | Wyatt ............................ 709/225 |

(Continued)

FOREIGN PATENT DOCUMENTS

JP 2002-024192 1/2002

(Continued)

*Primary Examiner* — John Follansbee
*Assistant Examiner* — Backhean Tiv
(74) *Attorney, Agent, or Firm* — Antonelli, Terry, Stout & Kraus, LLP.

(57) ABSTRACT

A resource management system including a plurality of computer systems and providing services through operations of task applications by combining the plurality of the computer systems, which comprises: a storage which is included in at least one of the computer systems for storing information for identifying the computer systems which execute the task applications, respectively, and resource utilization rate information which includes utilization rates of resources configuring the respective computer systems; and an effected range investigation unit which is included in at least one of the computer systems and obtains utilization rates of additional resources required by a task application from the resource utilization rate information when the effected range investigation unit obtains information that the task application requires the additional resources of the computer systems; and sums utilization rates of resources configuring newly configured computer systems.

15 Claims, 26 Drawing Sheets

U.S. PATENT DOCUMENTS

| | | | |
|---|---|---|---|
| 2003/0225878 A1* | 12/2003 | Eatough et al. | 709/224 |
| 2003/0236745 A1* | 12/2003 | Hartsell et al. | 705/40 |
| 2004/0103193 A1* | 5/2004 | Pandya et al. | 709/224 |
| 2004/0194061 A1* | 9/2004 | Fujino | 717/120 |
| 2004/0213153 A1 | 10/2004 | Nagato et al. | |
| 2004/0221038 A1* | 11/2004 | Clarke et al. | 709/226 |
| 2005/0138175 A1* | 6/2005 | Kumar et al. | 709/226 |
| 2006/0026010 A1* | 2/2006 | van Moorsel et al. | 705/1 |
| 2006/0085554 A1* | 4/2006 | Shah et al. | 709/235 |
| 2006/0212594 A1* | 9/2006 | Haner et al. | 709/232 |
| 2006/0218285 A1* | 9/2006 | Talwar et al. | 709/227 |
| 2006/0224925 A1* | 10/2006 | Lake | 714/38 |
| 2007/0061464 A1* | 3/2007 | Feng et al. | 709/226 |
| 2007/0094343 A1* | 4/2007 | Sangle et al. | 709/207 |
| 2007/0094375 A1* | 4/2007 | Snyder et al. | 709/223 |
| 2007/0106796 A1* | 5/2007 | Kudo et al. | 709/226 |
| 2007/0233865 A1* | 10/2007 | Garbow et al. | 709/226 |
| 2007/0266391 A1* | 11/2007 | Hoffman et al. | 718/106 |
| 2007/0282992 A1* | 12/2007 | Liu | 709/223 |
| 2008/0183543 A1* | 7/2008 | Li et al. | 705/8 |
| 2009/0019163 A1* | 1/2009 | Pecus | 709/226 |
| 2009/0204694 A1* | 8/2009 | Kaneko | 709/223 |

FOREIGN PATENT DOCUMENTS

JP  2003-330899  11/2003

* cited by examiner

FIG.9

Task object table  402

| Task ID | Name | SLO |
|---|---|---|
| G0000001 | Task 1 | Processed number per unit time |
| G0000002 | Task 1 | ... |
| G0000003 | Task 1 | ... |
| ⋮ | ⋮ | ⋮ |

Task policy table  405

| Task ID | Event | Policy action | Name | Reason |
|---|---|---|---|---|
| G0000001 | Event content 1 | Description of first priority policy action | Scale out.. | Overload.. |
| G0000001 | Event content 1 | Description of second priority policy action | Second.. | ... |
| G0000001 | Event content 1 | Description of third priority policy action | Third.. | ... |
| G0000001 | Event content 2 | Description of first priority policy action | ... | ... |
| G0000001 | Event content 2 | Description of second priority policy action | ... | ... |
| G0000001 | Event content 3 | Description of first priority policy action | ... | ... |
| G0000001 | Event content 3 | Description of second priority policy action | ... | ... |
| G0000002 | Event content 1 | Description of first priority policy action | ... | ... |
| ⋮ | ⋮ | ⋮ | ⋮ | ⋮ |

Resource object table     ~407

| Resource ID | Attribute | Attribute specification |
|---|---|---|
| R0000001 | CPU | xxxxx |
| R0000001 | CPU clock frequency | 1GHz |
| R0000001 | Memory | 1GB |
| R0000001 | Disc | 40GB |
| R0000001 | OS | xxxxx |
| R0000001 | Reason | Task computer |
| R0000001 | IP address | xxx.xxx.xxx.xxx |
| R0000001 | Host name | Computer1 |
| R0000002 | CPU | xxxxx |
| ⋮ | ⋮ | ⋮ |

Resource utilization rate table ~410

| Task ID | Task configuration ID | Resource ID | Sub-resource type | User-defined utilization rate | | Utilization rate measured by utilization rate measurement unit | | | |
|---|---|---|---|---|---|---|---|---|---|
| | | | | User-estimated utilization rate | Date and time specified peak utilization rate | Average utilization rate in one hour | One day /One week utilization rate | Total time utilization rate | Maximum utilization rate |
| G0000001 | A0000001 | R0000001 | CPU | 10% | ... | 7% | 11% | 10% | 13% |
| G0000001 | A0000001 | R0000001 | Memory | 30% | ... | 20% | 19% | 25% | 30% |
| G0000001 | A0000001 | R0000001 | Disc volume | 5% | ... | 4% | 5% | 4% | 5% |
| G0000001 | A0000001 | R0000001 | Printer port | 0% | ... | 0% | 0% | 0% | 0% |
| G0000001 | A0000001 | R0000001 | Network resource | 10% | ... | 5% | 7% | 8% | 10% |
| G0000001 | A0000001 | R0000004 | CPU | 8% | ... | 5% | 9% | 8% | 11% |
| G0000001 | A0000001 | R0000004 | Memory | 30% | ... | 20% | 19% | 25% | 30% |
| G0000001 | A0000001 | R0000004 | Disc volume | 30% | ... | 34% | 35% | 34% | 35% |
| G0000001 | A0000001 | R0000004 | Printer port | 0% | ... | 0% | 0% | 0% | 1% |
| G0000001 | A0000001 | R0000004 | Network resource | 10% | ... | 3% | 5% | 6% | 8% |

1202  1203  1204  1205  1206  1207  1208  1209  1210  1211

1201: Time slot assignment of high load utilization 2006/10/25 17:00_2006/10/25 20:00_40%

Followed by FIG. 13

FIG.13

Continued from FIG. 12

| | | | | | | | | | |
|---|---|---|---|---|---|---|---|---|---|
| G0000 002 | A00000 04 | R000 0001 | CPU | 5% | ... | 5% | 4% | 5% | 8% |
| G0000 002 | A00000 04 | R000 0001 | Memory | 10% | ... | 8% | 7% | 10% | 11% |
| G0000 002 | A00000 04 | R000 0001 | Disc volume | 30% | ... | 25% | 31% | 28% | 31% |
| G0000 002 | A00000 04 | R000 0001 | Printer port | 60% | ... | 55% | 50% | 60% | 76% |
| G0000 002 | A00000 04 | R000 0001 | Network resource | 30% | ... | 30% | 25% | 30% | 32% |
| G0000 004 | A00000 08 | R000 0007 | CPU | 50% | ... | 60% | 58% | 55% | 62% |
| G0000 004 | A00000 08 | R000 0007 | Memory | 25% | ... | 30% | 28% | 27% | 33% |
| G0000 004 | A00000 08 | R000 0007 | Disc volume | 15% | ... | 10% | 10% | 10% | 11% |
| G0000 004 | A00000 08 | R000 0007 | Printer port | 0% | ... | 0% | 0% | 0% | 0% |
| G0000 004 | A00000 08 | R000 0007 | Network resource | 25% | ... | 20% | 21% | 18% | 25% |
| G0000 008 | A00000 12 | R000 0010 | CPU | 65% | ... | 65% | 60% | 70% | 80% |
| G0000 008 | A00000 12 | R000 0010 | Memory | 20% | ... | 20% | 18% | 25% | 30% |
| G0000 008 | A00000 12 | R000 0010 | Disc volume | 10% | ... | 10% | 10% | 10% | 12% |
| G0000 008 | A00000 12 | R000 0010 | Printer port | 0% | ... | 0% | 0% | 0% | 0% |
| G0000 008 | A00000 12 | R000 0010 | Network resource | 30% | ... | 30% | 28% | 31% | 35% |
| ⋮ | ⋮ | ⋮ | ⋮ | ⋮ | ⋮ | ⋮ | ⋮ | ⋮ | ⋮ |

FIG.14

Task configuration object attribute table ~413

| Task ID | Task configuration object | Name | Sub-resource type | Preferential sub-resource type | Relation |
|---|---|---|---|---|---|
| G0000001 | A0000001 | Web server | CPU, Memory | CPU | A0000002 |
| G0000001 | A0000002 | AP server | CPU, Memory, Network | Memory | A0000003 |
| G0000001 | A0000003 | DB server | CPU, Memory, Disc volume, .. | Disc volume | — |
| G0000002 | A0000004 | Web server | CPU | CPU | A0000002 |
| ⋮ | ⋮ | ⋮ | ⋮ | ⋮ | ⋮ |

Task policy execution parameter table ~414

| Task ID | Parameter information for policy execution |
|---|---|
| G0000001 | Parameters for policy execution of G0000001<br>・Utilization rate items to be referenced at effected area investigation<br>・Automatic investigation of policy action effect<br>・Resource display order of policy execution target<br>・Others |
| G0000002 | Parameters for policy execution of G0000002 |
| G0000003 | Parameters for policy execution of G0000003 |
| ⋮ | ⋮ |

Task configuration table 412

| Task ID | Task configuration object | Resource ID to be utilized | Load dispersion balance rate | |
|---|---|---|---|---|
| G0000001 | A0000001 | R0000001 | 100 | ~1714 |
| G0000001 | A0000002 | R0000002 | 100 | ~1715 |
| G0000001 | A0000003 | R0000003 | 100 | ~1716 |
| G0000002 | A0000004 | R0000004 | 100 | |
| G0000002 | A0000005 | R0000005 | 100 | |
| G0000002 | A0000006 | R0000003 | 100 | |
| ⋮ | ⋮ | ⋮ | ⋮ | |
| 1710 | 1711 | 1712 | 1713 | |

FIG.22

Task configuration table: before policy action ~2201

| Task ID | Task configuration object | Resource ID to be utilized | Load dispersion balance rate |
|---|---|---|---|
| G0000001 | A0000001 | R0000001 | 100 |
| G0000001 | A0000002 | R0000002 | 100 |
| G0000001 | A0000003 | R0000003 | 100 |
| G0000002 | A0000004 | R0000004 | 100 |
| G0000002 | A0000005 | R0000005 | 100 |
| G0000002 | A0000006 | R0000003 | 100 |
| G0000004 | A0000008 | R0000007 | 100 |
| G0000008 | A0000012 | R0000010 | 100 |
| ⋮ | ⋮ | ⋮ | ⋮ |

↓

Task configuration table: after policy action ~2202

| Task ID | Task configuration object | Resource ID to be utilized | Load dispersion balance rate |
|---|---|---|---|
| G0000001 | A0000001 | R0000001 | 50 |
| G0000001 | A0000001 | Rxxxxxxx | 50 |
| G0000001 | A0000002 | R0000002 | 100 |
| G0000001 | A0000003 | R0000003 | 100 |
| G0000002 | A0000004 | R0000004 | 100 |
| G0000002 | A0000005 | R0000005 | 100 |
| G0000002 | A0000006 | R0000003 | 100 |
| G0000004 | A0000008 | R0000007 | 100 |
| G0000008 | A0000012 | R0000010 | 100 |
| ⋮ | ⋮ | ⋮ | ⋮ |

Resource utilization rate table

| Task ID | Task configuration ID | Resource ID | Sub-resource type | User-defined utilization rate | | Utilization rate measured by utilization rate measurement unit | | | |
|---|---|---|---|---|---|---|---|---|---|
| | | | | User-estimated utilization rate | Date and time specified peak utilization rate | Average utilization rate in one hour | One day /One week utilization rate | Total time utilization rate | Maximum utilization rate |
| G0000001 | A0000001 | R0000007 | CPU | 30% | ⌐3001<br>... | ... | ... | ... | ... |
| G0000001 | A0000001 | R0000007 | Memory | 20% | ... | ... | ... | ... | ... |
| G0000001 | A0000001 | R0000007 | Disc volume | 5% | ... | ... | ... | ... | ... |
| G0000001 | A0000001 | R0000007 | Printer port | 0% | ... | ... | ... | ... | ... |
| G0000001 | A0000001 | R0000007 | Network resource | 10% | ... | ... | ... | ... | ... |
| G0000001 | A0000001 | R0000010 | CPU | 50% | ⌐3002<br>... | ... | ... | ... | ... |
| G0000001 | A0000001 | R0000010 | Memory | 30% | ... | ... | ... | ... | ... |
| G0000001 | A0000001 | R0000010 | Disc volume | 10% | ... | ... | ... | ... | ... |
| G0000001 | A0000001 | R0000010 | Printer port | 0% | ... | ... | ... | ... | ... |
| G0000001 | A0000001 | R0000010 | Network resource | 20% | ... | ... | ... | ... | ... |

Followed by FIG. 31

FIG.31

Continued from FIG. 30

| | | | | | | | | | |
|---|---|---|---|---|---|---|---|---|---|
| G0000 002 | A00000 04 | R000 0001 | CPU | ... | ... | ... | ... | ... | ... |
| G0000 002 | A00000 04 | R000 0001 | Memory | ... | ... | ... | ... | ... | ... |
| G0000 002 | A00000 04 | R000 0001 | Disc volume | ... | ... | ... | ... | ... | ... |
| G0000 002 | A00000 04 | R000 0001 | Printer port | ... | ... | ... | ... | ... | ... |
| G0000 002 | A00000 04 | R000 0001 | Network resource | ... | ... | ... | ... | ... | ... |
| G0000 004 | A00000 08 | R000 0007 | CPU | ... | ... | 60% | ...⌐3101 | ... | ... |
| G0000 004 | A00000 08 | R000 0007 | Memory | ... | ... | 30% | ... | ... | ... |
| G0000 004 | A00000 08 | R000 0007 | Disc volume | ... | ... | 10% | ... | ... | ... |
| G0000 004 | A00000 08 | R000 0007 | Printer port | ... | ... | 0% | ... | ... | ... |
| G0000 004 | A00000 08 | R000 0007 | Network resource | ... | ... | 20% | ... | ... | ... |
| G0000 008 | A00000 12 | R000 0010 | CPU | ... | ... | 65% | ...⌐3102 | ... | ... |
| G0000 008 | A00000 12 | R000 0010 | Memory | ... | ... | 20% | ... | ... | ... |
| G0000 008 | A00000 12 | R000 0010 | Disc volume | ... | ... | 10% | ... | ... | ... |
| G0000 008 | A00000 12 | R000 0010 | Printer port | ... | ... | 0% | ... | ... | ... |
| G0000 008 | A00000 12 | R000 0010 | Network resource | ... | ... | 30% | ... | ... | ... |
| ⋮ | ⋮ | ⋮ | ⋮ | ⋮ | ⋮ | ⋮ | ⋮ | ⋮ | ⋮ |

SYSTEM AND METHOD FOR MANAGING RESOURCES

CROSS REFERENCE TO RELATED APPLICATIONS

This application claims the foreign priority benefit under Title 35, United States Code, §119(a)-(d) of Japanese Patent Application No. 2006-209367, filed on Aug. 1, 2006, the contents of which are hereby incorporated by reference.

BACKGROUND OF THE INVENTION

1. Field of the Invention

The present invention relates to a resource management of an information processing system, and more particularly to a resource management system and a resource management method which provide countermeasures for continuously operating the information processing system when the system is involved in an overload or troubles, by utilizing a technology for virtualizing the information processing system through objectizing and a policy control technology for managing operation of the information processing system.

2. Description of Relevant Art

In recent years, most of operation services in, for example, companies are performed by using an information processing system. Therefore, high reliabilities and high flexibilities are required in the system.

When a trouble such as an expected overload, accident, and abnormality happens in the information processing system, a quick and correct action is required for minimizing an economical loss due to, for example, stopping operation services, and falling of credit of such a customer who uses the information processing system.

Therefore, a policy control processing technology has been developed for diagnosing a trouble condition and providing a countermeasure for avoiding the trouble when the trouble happens in the information processing system.

In general, as a policy control processing, if a trouble happens an alternative computer is assigned; in a case of overload, an additional computer is dynamically added (processing of this practical counteraction is defined as a policy action).

Here, as a verification method for verifying whether or not a computer system assigned to an alternative is usable, a method for verifying whether or not the computer is already in some trouble has been proposed in Japanese Patent Laid-open Publication No. 2003-330899 and US 2004/0213153A1. In addition, in the patent literatures No. 2003-330899 and US 2004/0213153A1, a method for assigning an overload processing to a shared computer system has been also proposed.

Meanwhile, as operation services by the information processing system according to the present invention, for example, a payroll calculation and sales management in a company are listed up. However, the present invention is not limited to these, but includes various kinds of processing and functions achieved by using the information processing system. For example, a processing and function for providing services of a Web information delivery, an advance sale for tickets, an online sale, and the like; or services themselves are included in the task service.

There exist various kinds of information processing systems which are utilized in, for example, a company due to different architectures supplied by each vendor. In addition, it is preferable to use resources as efficiently as possible. Further, operation services provided by the information processing system may not be configured with a single resource, but may be configured with a combination of a plurality of resources in many cases, for complying with a complex utilization configuration due to a large scale, high performance, and high reliability service.

In the aforementioned patent literatures No. 2003-330899 and US 2004/0213153A1, since operation services with a single configuration and a single resource are handled, it is difficult to apply the systems of the above literatures to a case where an information processing system is configured with multi-layers and a plurality of resources, and a case to handle operation services (for example, Web system, batch system, DB: Data Base, and ledger sheet output) which have various kinds of processing.

SUMMARY OF THE INVENTION

Therefore, there is provided a following method by the present invention.

When a plurality of resources are shared, the method for obtaining a resource which does not effect on another information processing system is provided even when it is already in operation, with respect to resources to be used in a policy control of a plurality of information processing systems which are configured with a plurality of resources and with multi-level layers, and which use the resources duplicatedly.

According to the present invention, there is provided a resource management system including a plurality of computer systems and providing services through operations of task applications by combining the plurality of computer systems, the resource management system comprises: a storage storing information for identifying the computer systems which execute the respective task applications and resource utilization rate information which includes utilization rates of resources configuring the respective computer systems in at least one of the computer systems; and an effected range investigation unit which obtains utilization rates of additional resources required by a task application from the resource utilization rate information when the effected range investigation unit obtains information that the task application requires the additional resources of the computer systems; and sums utilization rates of resources configuring a newly configured computer systems in at least one of the computer systems.

Other embodiments of the present invention will be described later in detail.

According to the present invention, in the information processing system which provides task services by combining a plurality of resources, effects on another computer system already in operation can be obtained when obtaining a resource to execute a policy action. Therefore, it becomes possible to utilize the resources effectively for increasing the operation rate of the information processing system and for improving the reliability of the information processing system.

BRIEF DESCRIPTION OF THE DRAWINGS

FIG. 9 is an illustration showing an example of information stored in a task object table;

FIG. 10 is an illustration showing an example of information stored in a task policy table;

FIG. 11 is an illustration showing an example of information stored in a resource object table;

FIG. 12 is an illustration showing an example of information stored in a resource utilization rate table;

FIG. 13 is an illustration showing an example of information stored in a resource utilization rate table;

FIG. 14 is an illustration showing an example of information stored in a task configuration object attribute table;

FIG. 15 is an illustration showing an example of information stored in a task policy execution parameter table;

FIG. 17 is an illustration showing an example of information stored in a task configuration table;

FIG. 22 is an illustration showing an example of information stored in a task configuration table before and after executing a policy action;

FIG. 30 is an illustration showing another example of information stored in a resource utilization rate table;

FIG. 31 is an illustration showing another example of information stored in a resource utilization rate table;

DETAILED DESCRIPTION OF THE PREFERRED EMBODIMENTS

Hereinafter, embodiments according to the present invention will be explained in detail by referring to attached drawings.

First Embodiment

<Example of System Configuration>

Figure 1:
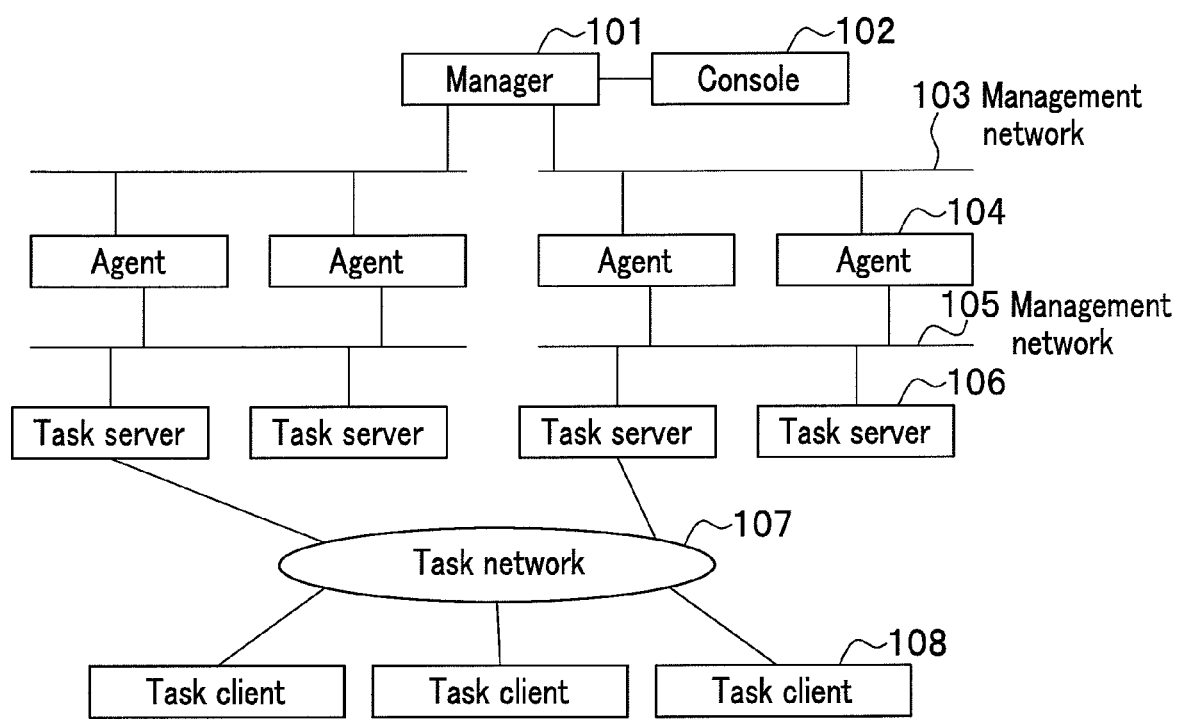
FIG. 1 is an illustration showing an example of a whole system configuration according to an embodiment of the present invention.

An example of a whole system configuration according to a first embodiment of the present invention is shown in FIG. 1.

As shown in FIG. 1, a system according to the embodiment is configured with a plurality of task servers 106 which provide task services to clients by operating a task application, a manager 101 which implements an execution control and policy control of the task application, a console 102 which is capable of referring to an execution status and policy control status of the task application, and an agent 104 which monitors each task server 106. The configuration members are connected to each other via management networks (103, 105). In addition, the task server 106 provides task services to a task client 108 via a task net work 107.

Meanwhile, the manager 101 corresponds to a "resource management system".

With respect to the task server 106 which executes a task application, there are various kinds of and a plurality of task servers 106 corresponding to various kinds of OS (Operating System) and computers. They provide task services by dynamically assigning task applications to resources which are selected under conditions for operating the task applications.

Meanwhile, in the configuration shown in FIG. 1, a plurality of agents 104 are arranged for monitoring respective task servers 106. However, it is possible to arrange a single agent 104 for monitoring the plurality of servers 106. In addition, each of the task servers 106 can monitor itself by installing an agent program on each of the task servers 106.

In addition, with respect to the task servers 106, for example, some of the task servers 106 may be arranged in another protective network by considering a security in general, or a unit such as a firewall and the like may be set against net works outside the task servers 106. However, since there are few relations between the present invention and the above, the explanation will be omitted.

In the embodiment, the task servers 106 and clients 108 are four sets and three sets, respectively, as examples. However, the set numbers are not limited to the above. The numbers may be more, or may be less than that of in FIG. 1. This is the same regarding a number of the agent 104 which monitors the task server 106.

In addition, with respect to the task network 107, for example, LAN (Local Area Network) or WAN (Wide Area Network) may correspond to this in general. However, any kind of network capable of providing a service from the task server 106 to the client 107 can be used.

As for the manager 101, a processing of the manager 101 may be decentralized by configuring the processing as a multi-layers type.

Figure 2:
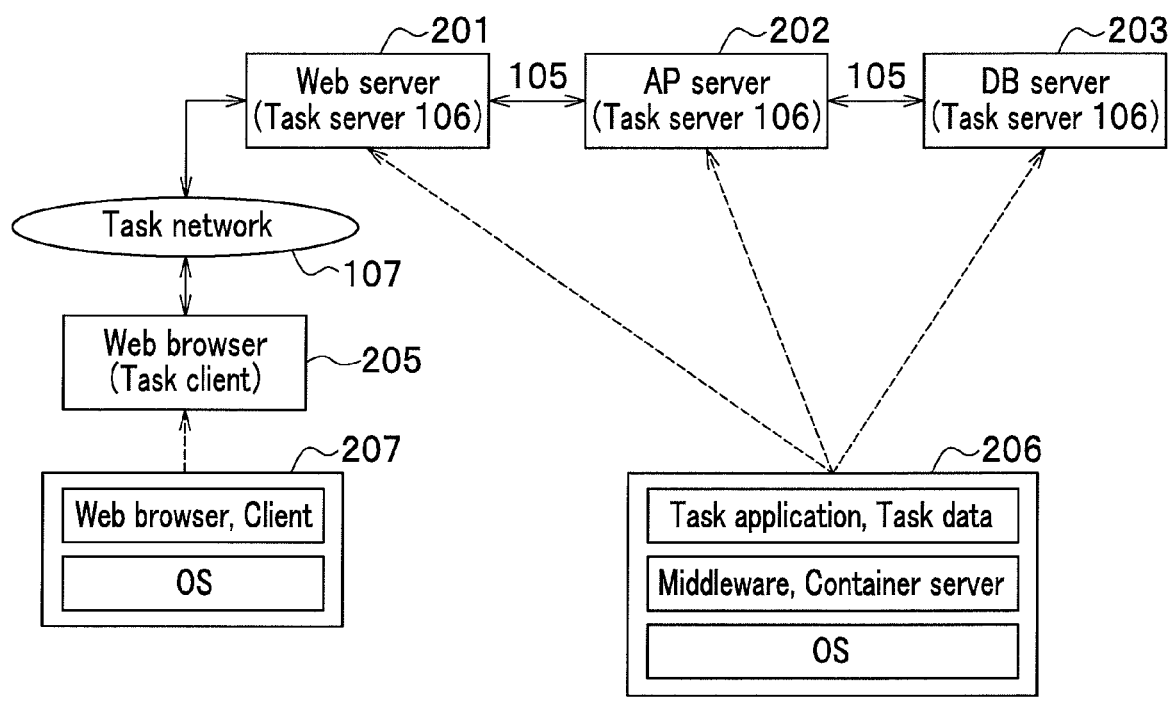
FIG. 2 is an illustration showing an example of a task system configuration.

Next, in FIG. 2, an example of a task system configuration is shown for providing task services in the system configuration shown in FIG. 1. For example, a Web server 201, an AP (Application) server 202, and a DB (Data Base) server 203, which are the task server 106, configure a Web application of three-level layers by being connected via the management network 105 shown in FIG. 1, thereby providing a service by combining a plurality of task servers 106. A task service is available at a Web browser 205, which is the task client 108, via the task network 107.

Meanwhile, in FIG. 2, a box shown with a reference number 206 is blocks showing an internal configuration of the Web server 201, the AP sever 202, and the DB server 203, and a box shown with a reference number 207 is that of the Web browser 205. These relations are shown with arrowed dotted lines in FIG. 2.

In FIG. 2, an example is cited, in which a Web application of three-level layers for providing a task service is configured with a plurality of task servers. However, a system may be a single task server 106 for providing a task service.

In addition, the reference number 206 in FIG. 2 shows an internal configuration of the task server 106 such as the Web server 201, the AP server 202, and the DB server 203. First, an OS (Operating System) runs, subsequently, a middleware and container server run on the OS. Further, for example, a task application may run and task data may be managed on the middleware and the container server (A configuration in which a task application directly runs on the OS may be also available). The reference number 207 in FIG. 2 shows the internal configuration of the Web browser 205 (task client 108), and the Web browser and a program designed for a client run on the OS.

<Unit Configuration>

Figure 3:
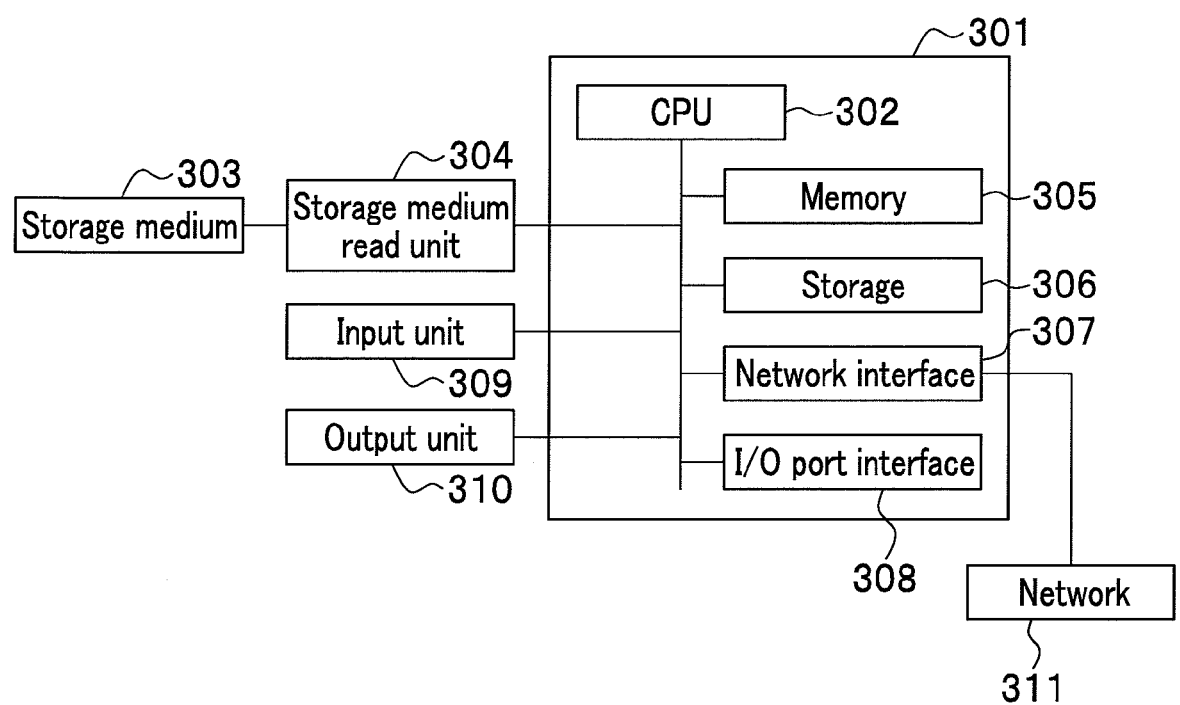
FIG. 3 is an illustration showing an example of a unit configuration configuring a system.

FIG. 3 is an illustration showing a configuration example of each apparatus such as the manager 101, the agents 104, the task servers 106, and the task clients 108, which are shown in FIG. 1. An apparatus 301 in FIG. 3 shows that it is configured with a CPU (Central Processing Unit) 302, a memory 305, a storage 306, a network I/F (Interface) 307, and an I/O port I/F 308. In addition, a storage medium read unit 304 for reading stored information in the storage medium 303, an input unit 309 such as a keyboard, and an output unit 310 such as a printer may be included in each of the apparatuses, as needed.

A configuration of each of the apparatuses is almost identical. However, when the configuration is different, if the configuration has functions identical to those of the identical configuration, it is no matter even if the configuration is, for example, a virtual computer. In addition, each of the apparatuses provides each function, by, for example, executing a program stored in each of the storages 306.

<Task Service Providing Method>

A system according to the embodiment has a characteristic to execute a task application and a policy execution of the task application as one job, and provides task services through execution of the task application and countermeasures for monitoring the task application and troubles, thereby making the task application to be operated continuously. As an example of the task application, a Web application of three-level layers system is exemplified. However, any environment may be used, and the environment is not needed to be same if a task application can be executed by dynamically assigning the application on resources in the environment. A task application other than the present embodiment may also be available.

The present invention may be applied not only to a system which dynamically assigns a task application, such as the present embodiment, but also to any system which continuously executes the task application by a policy control.

Meanwhile, a specific example of a policy execution processing will be explained later.

<Manager>

Figure 4:
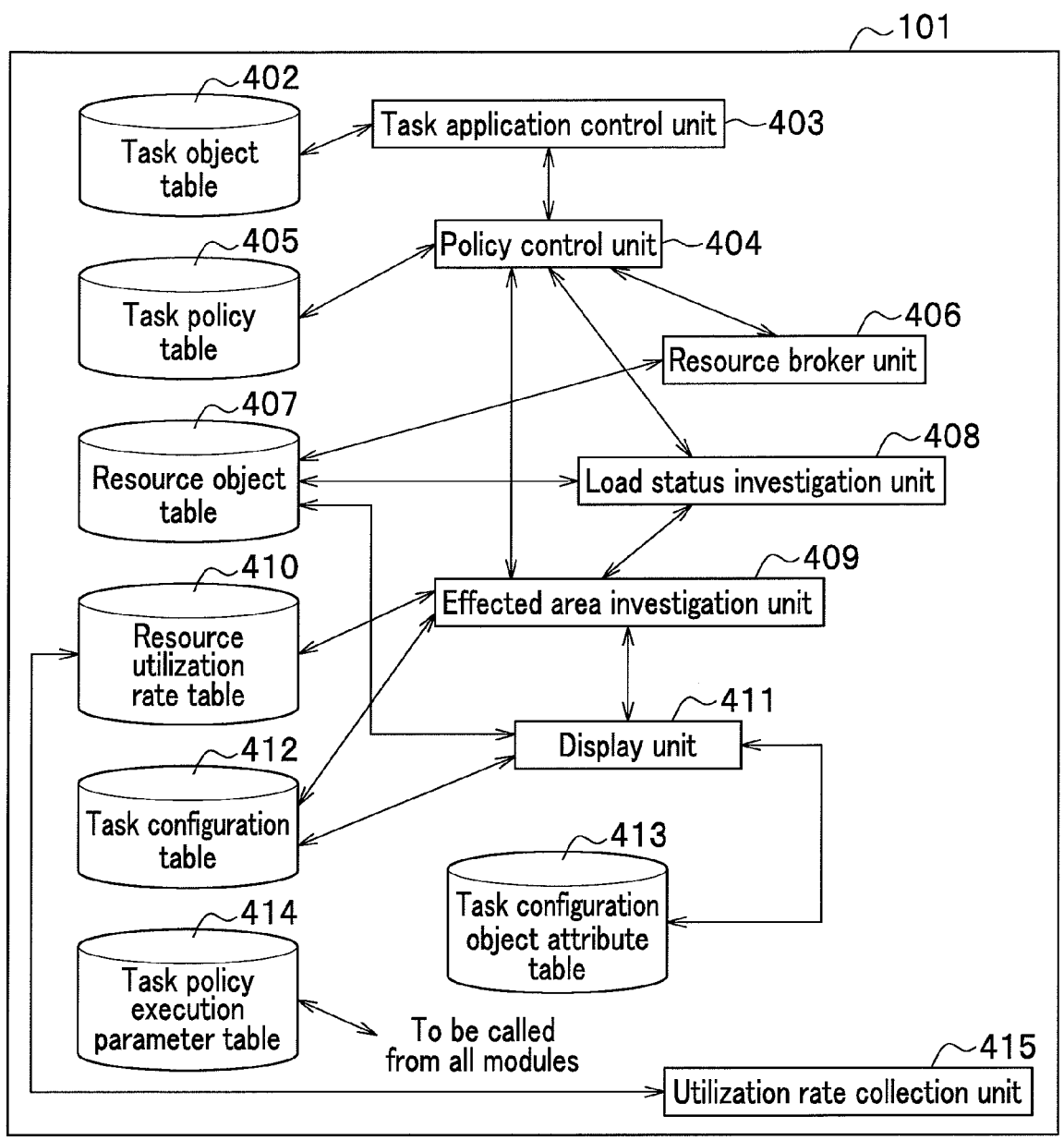
FIG. 4 is an illustration showing an example of a module configuration of a manager.

FIG. 4 is an illustration showing a configuration example of modules and tables configuring a manager 101 according the embodiment of the present invention. Arrows in FIG. 4 indicate relations between each module and table.

The modules included in the manager 101 are a task application control unit 403 which manages a task application execution, a policy control unit 404 which controls an execution of a policy installed in the task application, a resource broker unit 406 which retrieves a target of a resource when a policy action is executed, a load status investigation unit 408 which obtains a load status of a resource, an effected range investigation unit 409 which investigates effects when a policy action is executed, a display unit 411 which displays a job execution status and a policy action executing status, and an utilization rate collection unit 415 which periodically collects an utilization status of each resource.

In addition, as a table which is utilized by each of the above modules, the manager 101 includes a task object table 402 which manages a task application in operation by ID and name for identifying the task application, a task policy table 405 which manages a policy action description (countermeasure is called as policy action.) describing an event occurring on the task application and countermeasures to the event, and a resource object table 407 which objectizes a resource by utilizing a technology of a virtual object and manages the ID for identifying a resource and an attribute and attribute value of each resource.

The manager 101 further includes a resource utilization rate table 410 which manages a utilization rate ("User-defined utilization rate") defined for each sub-resource (for example, "CPU" and "Memory" which configure a resource are defined as sub-resource) in a resource when task configuration objects configuring a task application are operated on the resource, or a utilization rate actually collected from the agent 104, a task configuration table 412 which manages a task application and task configuration objects configuring the task application; and further manages relation information between the task application and a resource which is really used by the task configuration objects, a task policy execution parameter table 414 which manages information for controlling operation of each module which is included in the manager 101, and a task configuration object attribute table 413 which manages relation information between a task application and a task configuration objects and their attribute information. Meanwhile, sub-resources in the resource utilization table 410 are not limited to the items defined in the table, but anything can be added if it has a common indicator among the task applications. In addition, it is possible to define an item to be referred to in advance depending on a task application.

It is noted that each of the aforementioned modules and tables is utilized by installing them in the memory 305 and the storage 306 in the unit configuration shown in FIG. 3. A detailed configuration of each of the tables and an example of information stored in the table will be described later by referring to figures. Each of the tables included in the manager 101 corresponds to a "storage unit".

Further, a task configuration table 412 (this will be described later in FIG. 17) and the resource utilization rate table 410 correspond to "resource utilization rate information", and the task policy table 405 corresponds to "policy information".

<Agent>

Figure 5:
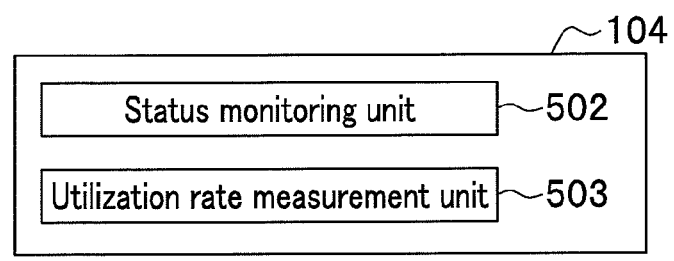
FIG. 5 is an illustration showing an example of a module configuration of an agent.

FIG. 5 is an illustration showing an example of a module configuration of an agent 104.

The agent 104 includes a status monitoring unit 502 which monitors a status for recognizing a status change of a resource and transmits an event message when the status is changed (for example, overload, troubles); and a utilization rate measurement unit 503 for periodically collecting a loading condition of a resource. The modules are respectively installed in the memory 305 and storage 306 in the unit configuration shown in FIG. 3, and utilized. The agent is also required to have tables requested for the controlling (for example, tables for initial setting and for indicating what item is being measured). However, since these tables are not essential in the present invention, only modules will be explained, and an explanation on a unique function and the like of each of the modules will be omitted.

<Interaction Between Manager and Agent>

Figure 6:
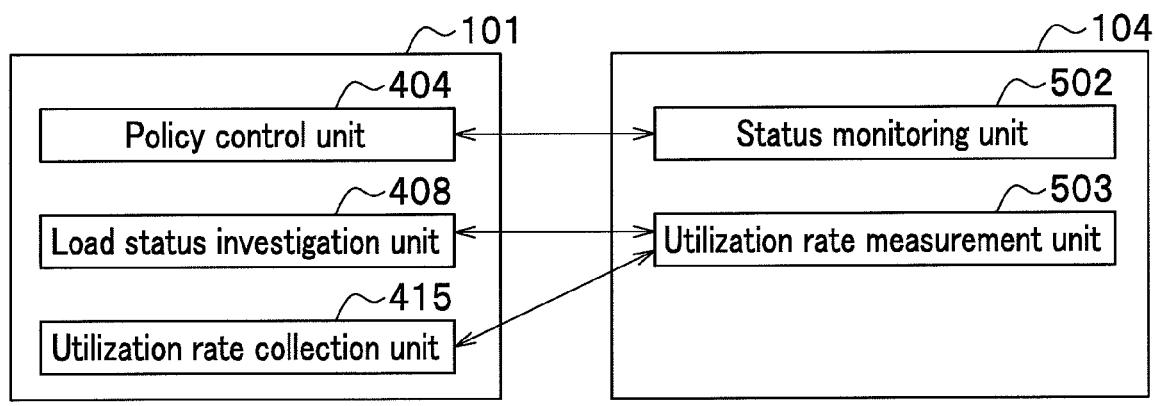
FIG. 6 is an illustration for explaining interactions between a manager and an agent.

FIG. 6 shows an interaction between the manager 101 and agent 104. Because the manager 101 is required to obtain a sign of troubles with which a policy execution of a task application in operation starts, the policy control unit 404 instructs a status monitoring of the task application to the status monitoring unit 502. If any status change is observed, the state monitoring unit 502 transmits an event message of the change, and the message is received by the policy control unit 404. Then, an execution of a policy control processing starts.

In addition, because utilization rates of a task application and resources are required as a factor for executing the policy control processing, the load status investigation unit 408 and the utilization rate collection unit 415 instruct collection of the utilization rates to the utilization rate measurement unit 503. The utilization rate measurement unit 503 transmits utilization rate information obtained by the agent 104, and the information is received by the load status investigation unit 408 and utilization rate collection unit 415. Then, utilization rate values are stored in the tables. The utilization rate values stored in the tables are referenced in the policy control processing.

Meanwhile, in FIG. 6, a configuration, in which the status monitoring unit 502 is located on the agent 104 side, is shown as an example. However, a configuration of a polling type interaction may also be available, where the status monitoring unit 502 is located on a manager 101 side, periodically collects the utilization rates from the manager 101 side, and evaluates a status change.

<Effected Range Investigation Method and Polling Action>

Figure 7:
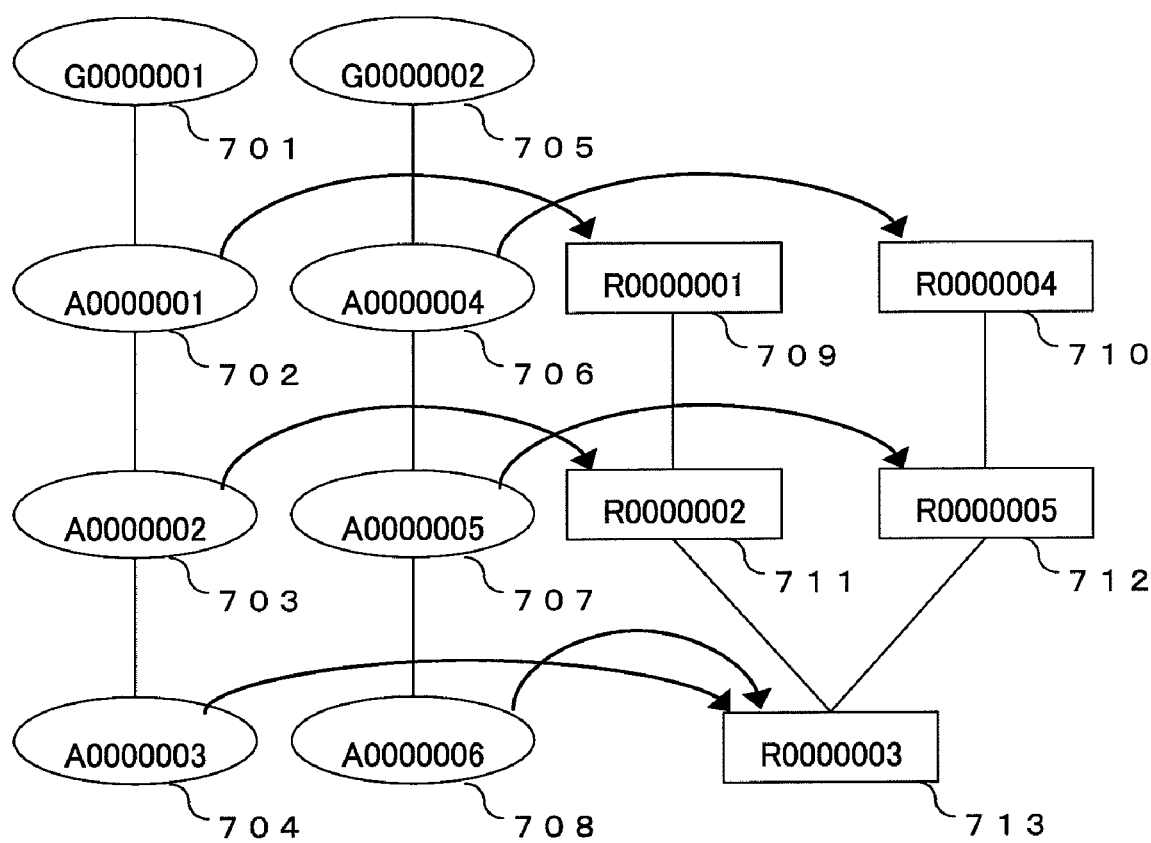
FIG. 7 is an illustration showing relations among task applications, task objects, and resources.

FIG. 7 is an illustration showing relations among a task application, a task object configuring the task application, and an object model of a resource. "G0000001" of a reference number 701 which indicates a task application is configured with "A0000001" of a reference number 702 which indicates a task configuration object, "A0000002" of a reference number 703, and "A0000003" of a reference number 704. The "A0000001" of the reference number 702, "A0000002" of the reference number 703, and "A0000003" of the reference number 704 are shown in operation with arrows by using "R0000001" of a reference number 709, "R0000002" of a reference number 711, and "R0000003" of a reference number 713, which indicate an object of each resource. Considering the above relations in the task system shown in FIG. 2, "A0000001" of the reference number 702 corresponds to the Web server 201, "A0000002" of the reference number 703 corresponds to the AP server 202, and "A0000003" of the reference number 703 corresponds to the DB server 203 in a modeling, and they configure one task service.

In addition, "G0000002" of a reference number 705 which indicates another task application is configured with "A0000004" of a reference number 706 which indicates a task configuration object, "A0000005" of a reference number 707, and "A0000006" of a reference number 708. "A0000004" of the reference number 706, "A0000005" of the reference number 707, and "A0000006" of the reference number 708 are shown with arrows to operate by using "R0000004" of a reference number 710, "R0000005" of a reference number 712, and "R0000003" of the reference number 713, which indicate an object of each resource (In the illustration, task applications "G0000001" and "G0000002" share a resource. However, the "G0000001" and "G0000002" have not always same characteristics).

In addition, the illustration shows that task applications "G0000001" and "G0000002" share the resource "R0000003". A task configuration object configuring these task applications is dynamically assigned to a resource selected (resource brokering) from a pool in which various kinds of resources exist, and executed. Meanwhile, relations between a task application and a task configuration object, and the task configuration object and a resource are stored in a task configuration table 412 and task configuration object attribute table 413, which will be described later.

Figure 8:
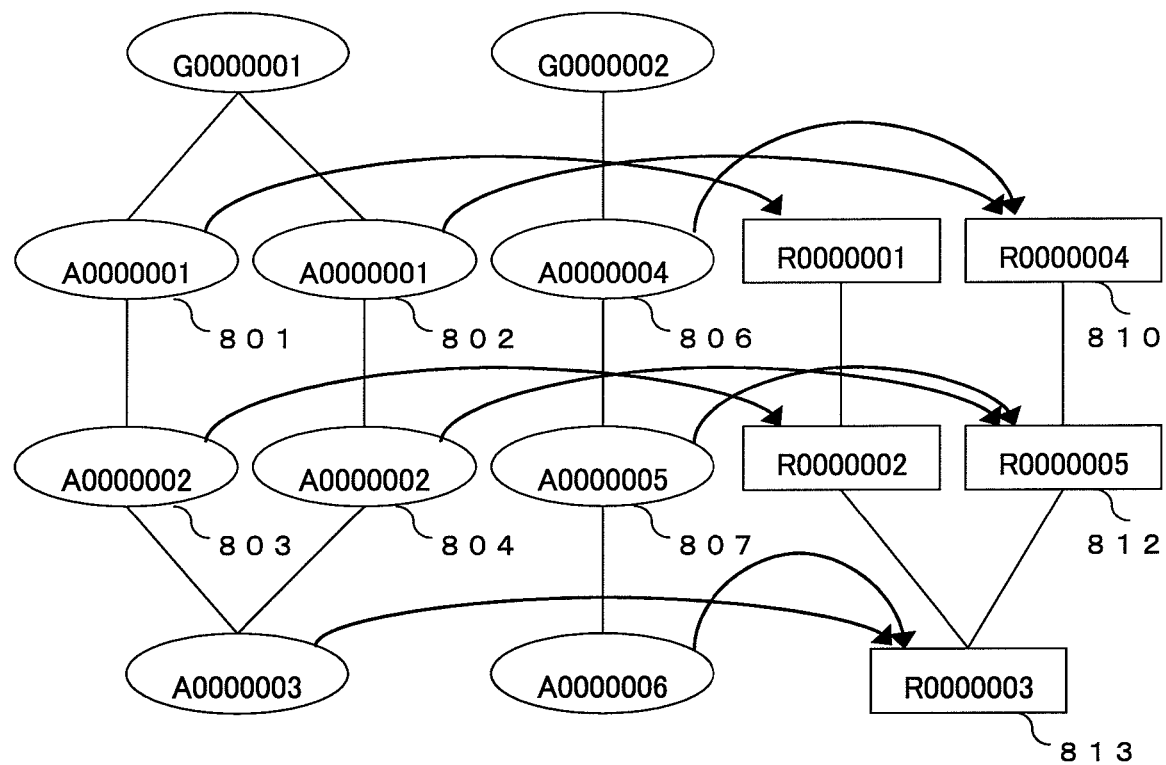
FIG. 8 is an illustration for explaining an investigation method of an effected range shown in FIG. 7.

FIG. 8 is an illustration for explaining an investigation method of an effected range in a configuration shown in FIG. 7. Here, since an overload phenomenon has occurred in the task application "G0000001", a policy action processing is just being executed in a policy control processing for continuously executing the task application. After confirming an overload status in the policy control processing, "A0000001" of a reference number 802 is added to "A0000001" of a reference number 801, and "A0000002" of a reference number 804 is added to "A0000002" of a reference number 803, respectively, as a countermeasure policy action. As a result, a load dividing is executed by a scale out of an amount of processing which has caused the overload phenomenon of the previous resource.

Here, "R0000004" of the reference number 810 is assigned as an executor of "A0000001" of the reference number 802 as a result of brokering of the resources, and also "R0000005" of the reference number 812 is assigned as an executor of "A0000002" of the reference number 804 as a result of brokering of the resources (The relations are shown with arrows).

In this brokering of the resources, a shared resource is set as a retrieval target for effective utilization of the resources by sharing the resources as many as possible. For investigating effects on a task application by a scale out, it is evaluated whether or not an execution of the scale out is acceptable from a sum of resource utilization rates of "A0000004" of the reference number 806, which is a task configuration object operated on "R0000004" of the reference number 810, and that of "A0000001" of the reference number 802 for an amount of the divided load.

In addition, it is also evaluated whether or not an execution of the scale out is acceptable from a sum of resource utilization rates of "A0000005" of the reference number 807, which is a task configuration object operated on "R0000005" of the reference number 812, and resource utilization rates of "A0000002" of the reference number 804 for an amount of the divided load.

Further, for simultaneously evaluating effects of a policy control execution of the task application "G0000001" on another task application, a load status of "R0000003" of a reference number 813 which is a shared resource with "G0000002" is also checked. In each of the resources, a sum of resource utilization rate of task configuration objects which use the resource is calculated, and if the sum of the utilization rate exceeds an amount (in the embodiment, the value is set at 100, but any value is available as needed) that the resource can process, it is determined that there exist effects on another task which is already in normal operation.

In addition, for example, even if resources of "R0000004" of the reference number 810 and "R0000005" of the reference number 812 have high performance capabilities, and succeed in scale outs, if a resource of "R0000003" of the reference number 813 is operated with a minimum performance necessary for the operation, an existence of the effects may be supposed. Therefore, it is also requested to evaluate whether the effects on shared resources between the task applications exist or not, by using the utilization rates.

Here, the utilization rate is evaluated by obtaining a sum of a utilization rate of each sub-resource such as "CPU" and "Memory", which are sub-resources configuring a resource. For example, if the task applications of "G000001" and "G0000002" are entirely different in processing configuration each other, each of the task applications may use different sub-resources to each other. Therefore, continuous parallel operations of the task applications on a same resource are available. On the other hand, if the processing configuration is identical, the sub-resources in a resource may be used in both task applications, thereby resulting in a conflict between the task applications. Accordingly, sharing the sub-resources become difficult.

Here, a case in which two task applications share resources has been shown as an example. However, three task applications may share resources.

<Processing Flow>

Hereinafter, a processing flow in the manager 101 shown in FIG. 4 will be explained by referring to a flowchart showing a processing procedure of each function unit (refer to FIG. 4, as needed). For operating the manager 101, it is required that information is stored in advance in a plurality of tables. First, an example of a table which records information will be explained.

FIG. 9 is an illustration showing an example of information stored in a task object table 402. A task ID 901 for identifying a task application and a name 902 corresponding to the task application are stored in the task object table 402. In the example shown in FIG. 9, "G0000001" to "G0000003" of the task ID 901, which indicate three task applications, and task application names corresponding to the three task applications are stored, and task applications currently in operation are shown. In addition, in the task object table 402, entries are added as many as jobs which must be executed. In 903, SLO (Service Level Object) of a service that the task application provides is stored. Here, a content of the SLO is SLA (Service Level Agreement), that is, it is an item of a service quality which is assured to a user by a business side, and the content of the SLO corresponds to the SLA. The item in 903 may be made as a request item which indicates a service level of the SLA.

Meanwhile, when an information display on a task application is required, other columnar information which indicates attributes of the task application other than the name 902 may be added.

Next, FIG. 10 is an illustration showing an example of information stored in a task policy table 405. In the task policy table 405, information of a policy action (execution method of specific countermeasures) indicated in the item of policy action 1003 is stored. A policy action is executed when an event shown in an item of an event 1002 happens (the trigger may be, for example, a notification of an event message from an agent) in a task ID 1001 which indicates a task application. A plurality of patterns, which are prioritized, of the policy action may be set for one event (in the embodiment, it is an entry order). In addition, in the name 1004 and explanation 1005, information which can identify a policy action is stored when a display indicating in operation of the policy is displayed on a console 102.

In the example shown in FIG. 10, policy actions of a task "G0000001" are set. Three events, "Event content 1", "Event content 2", and "Event content 3", are listed up as the event of "G0000001". Policy actions with priority orders 1 to 3 are set for the "Event content 1", policy actions with priority orders 1 and 2 are set for the "Event content 2", and policy actions with priority orders 1 and 2 are set for the "Event content 3".

Next, FIG. 11 is an illustration showing an example of information stored in a resource object table 407. In the resource object table 407, a resource ID 1101 which identifies a resource, an attribute 1102 and attribute value 1103 of the resource are stored. In the example shown in FIG. 11, a resource indicated by the resource ID "R0000001", and the attribute information (attribute 1102 and attribute value 1103) of the resource are shown as an example.

Meanwhile, in the FIG. 11, for example, "CPU", "CPU clock frequency", and the like are shown as attributes. However, the attributes are not limited to the above, but other attributes may also be set.

Next, FIG. 12 and FIG. 13 are illustrations showing examples of information stored in a resource utilization rate table 410. The resource utilization rate table 410 shown in FIG. 12 stores a sub-resource utilization rate when a task configuration object configuring a task application is operated on a resource.

In a "User-estimated utilization rate" 1206 which is a User-defined utilization rate indicated by a reference number 1212, estimated values of the utilization rates are stored, which are used by a task configuration object when the task configuration object uses a resource. In a "Date and time specified peak utilization rate" 1207, estimated values of the utilization rates in which a certain increase of the utilization rates is forecasted on the specified date and time are stored. Here, as a content of a format of the "Date and time specified peak utilization rate" 1207, "the utilization rate will be 40% during 17:00-20:00 on Oct. 25, 2006" is shown in the example indicated by a reference number 1201.

In addition, in an "Average utilization rate in one hour" 1208, which is a "Utilization rate measured by utilization rate measurement unit" of a reference number 1213 which indicates a utilization rate actually obtained from the agent 104, an average value of the utilization rate during the past one hour operation is stored. In a "One day/One week utilization rate" 1209, an average value of the utilization rate during the past one day or past one week operation is stored. In a "Total time utilization rate" 1210, an average value of the utilization rate of the past total operation time is stored. In addition, in a "Maximum utilization rate" 1211, a maximum utilization rate in the past operation is stored. Especially, items of the "User-estimated utilization rate" 1206 and, as needed, "Date and time specified peak utilization rate" 1207 of the "User-defined utilization rate" 1212 are required to be set in advance.

In addition, in the example shown in FIG. 12, a task configuration ID 1203 "A0000001" configuring a task ID 1202 "G0000001" which indicates a task application, and each utilization rate (1206, 1207) of "CPU", "Memory", "Disc volume", "Printer support", and "Network resource", which are sub-resource type 1205 corresponding to resource ID 1204 "R0000001" and "R0000004", are stored. If a utilization rate of each sub-resource is set, it is preferable to set the utilization rate of the sub-resource based on an accumulated utilization rate, by accumulating a utilization rate which is obtained, for example, when an operation of the task application is evaluated (since a reset of the utilization rate is available even after starting operation of a task service, it may be possible to use a value obtained in the task service operation). In addition, the sub-resources such as, "CPU", "Memory", "Disc volume", "Printer support", and "Network resource", are listed up here. However, the sub-resources are not limited to the above. Other than the above may be available to include.

Next, FIG. 14 is an illustration showing an example of information stored in a task configuration object attribute table 413. In the task configuration object attribute table 413, a Task ID 1401, a Task configuration object 1402, a Name 1403, a Sub-resource type 1404, a Preferential sub-resource type 1405, and Relation information 1406 are set as attributes of the task configuration object configuring a task application. A name of the task configuration object is stored in the Name 1403. In the Sub-resource type 1404, a sub-resource which is utilized by the task configuration object, as well as used for evaluation of the utilization rate is stored. In the Preferential sub-resource type 1405, a sub-resource type which is preferentially evaluated in evaluation of the utilization rate (for instance, in automatic execution of a policy) of the sub-resource is stored. In the Relation information 1406, a relation among task configuration objects configuring a task object is stored.

In the example shown in FIG. 14, as one example of the task configuration object attribute table 413, it is shown that "G0000001" of the Task ID 1401 which indicates a task application is configured with "A0000001" (Web server), "A0000002" (AP server), and "A0000003" (DB server) of the Task configuration object 1402. Here, it is shown that task configuration objects of the Task ID 1401 "G000001" have relations among "A0000001", "A0000002", and "A0000003". In addition, it is shown that target sub-resources for utilization rate evaluation of "A0000001" (Web server) are "CPU" and "Memory", and the "CPU" is preferentially evaluated.

Next, FIG. 15 is an illustration showing an example of information stored in a Task policy execution parameter table 414. In the Task policy execution parameter table 414, a Task ID 1501 and Parameter information 1502 are stored for changing a behavior of each module of the manager 101.

In the example shown in FIG. 15, it is shown that in each task application of the Task ID 1501 from "G0000001" to "G0000003", a unique parameter is set for each of the task applications. In a reference number 1503, the Parameter information 1502 of the Task ID 1501 "G0000001" is shown as an example. Here, rules for determining, for example, the following subjects are stored. That is, when an effected range is investigated, the rules for determining which utilization rate should be referenced, whether or not an execution status of a policy should be displayed on a screen or whether or not a resource with a minimum utilization rate should be automatically selected and the policy should be executed by the resource without displaying the execution status, and how to determine a display order of the resources when the execution status of the policy is displayed, are stored.

Next, operations of the manager 101 shown in FIG. 4 will be explained assuming that the aforementioned each of the tables is stored in the manager 101.

Figure 16:
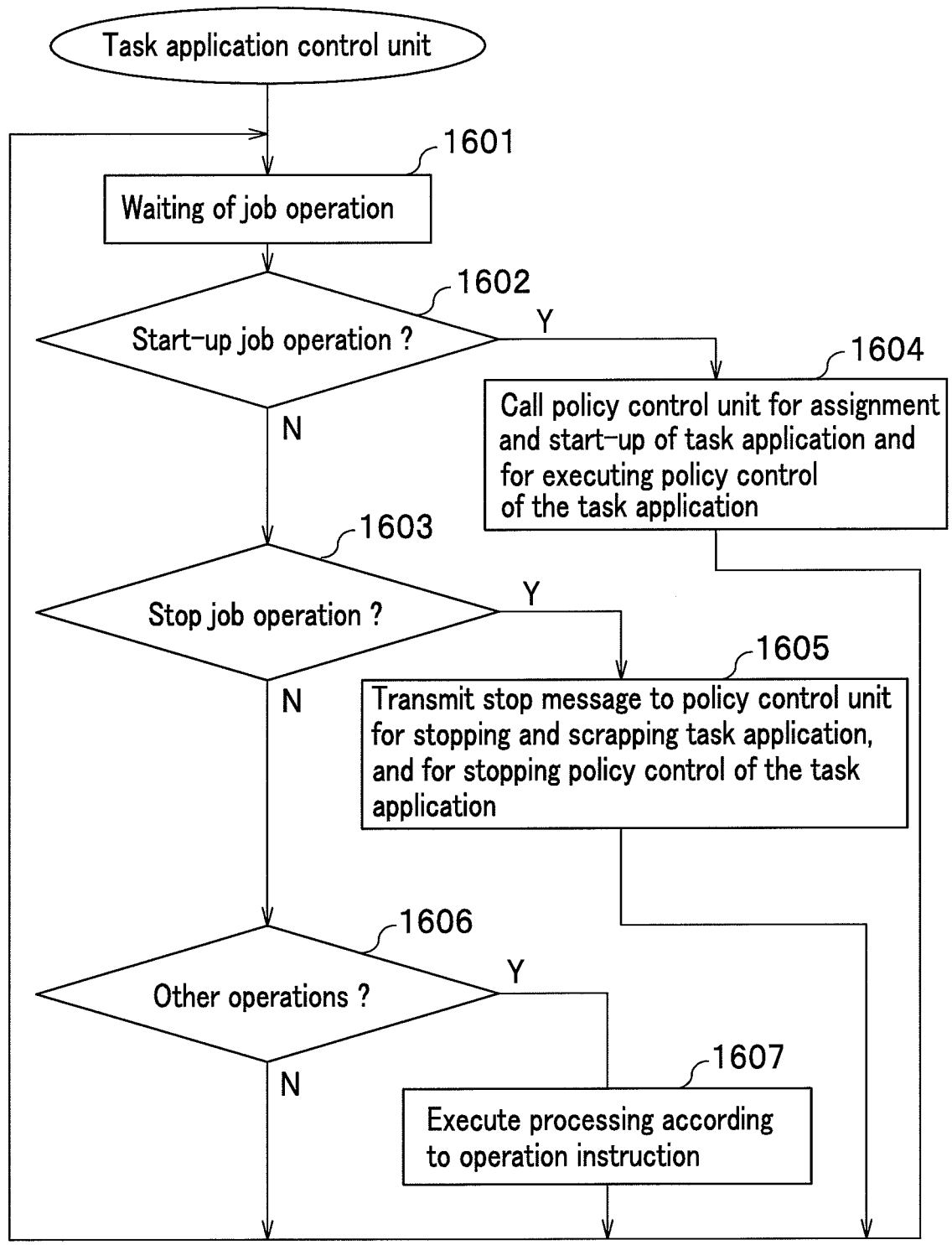
FIG. 16 is a flowchart showing a processing procedure in a task application control unit.

First, a flowchart in FIG. 16 shows a processing procedure in a task application control unit 403 for executing a start-up and stop of a task application. Meanwhile, a start-up of one task application (including policy control processing) is treated as one job in the embodiment.

A first processing of the flowchart shown in FIG. 16 is a wait state of a job (Step 1601), and when any operation is made, an operation content of the job is determined. When a job starts ("Y" in Step 1602), a task application is assigned and started as a start of the job. In addition, for starting up a policy control of the task application, a policy control unit 404 is called and executes a processing shown in FIG. 18 (Step 1604).

At this stage, in a Task configuration table 412 shown in FIG. 17, a Task ID 1710, a Task configuration object 1711, a Utilization resource ID 1712, and a Load dispersion balance rate 1713 are stored in advance as information relating to the task configuration object configuring the task application. The example in FIG. 17 shows a content of task configuration objects configuring two task applications. A task application of the Task ID 1710 of an item "G0000001" indicates that it is a Web application of three-level layers and configured with "A0000001", "A0000002", and "A0000003" of a Task configuration object 1711, and stores information of the Utilization resource ID 1712 which indicates a resource actually used by the task configuration object. It is shown that the Task configuration object 1711 from "A0000001" to "A0000003" utilizes a resource of each of the "R0000001", "R0000002", and "R0000003" of the Resource ID 1712. In addition, in the Load dispersion balance rate 1713, a dispersion rate of a processing is stored, for example, when a task configuration object is concurrently operated on a plurality of resources. Since each task configuration object utilizes one resource at this stage, the all Load dispersion rates 1713 are filled with "100".

Next, when an operation of a job is not a start-up ("N" in Step 1602), but a stop of the job ("Y" in Step 1603), a task application is stopped or scrapped for stopping the job. In addition, a stop message is transmitted (Step 1605) to the policy control unit 404 for stopping a policy control of the task application.

Meanwhile, in this system, an operation of a job other than the "Start up" and "Stop" may be executed (for example, display of job, "Y" in Step 1606), and may be processed corresponding to an instruction of the operation (Step 1607). However, the detail will be omitted since this part is not essential in the present invention.

After completing a series of the processing, the processing returns again to the wait state of a job at Step 1601. In regard to a processing of the task application control unit 403 shown in FIG. 16, a screen for starting or stopping a job is displayed on the console 102 (refer to FIG. 1) in general, thereby resulting in easy utilization for a user. However, the detail will be omitted since the part is not essential in the present invention.

Figure 18:
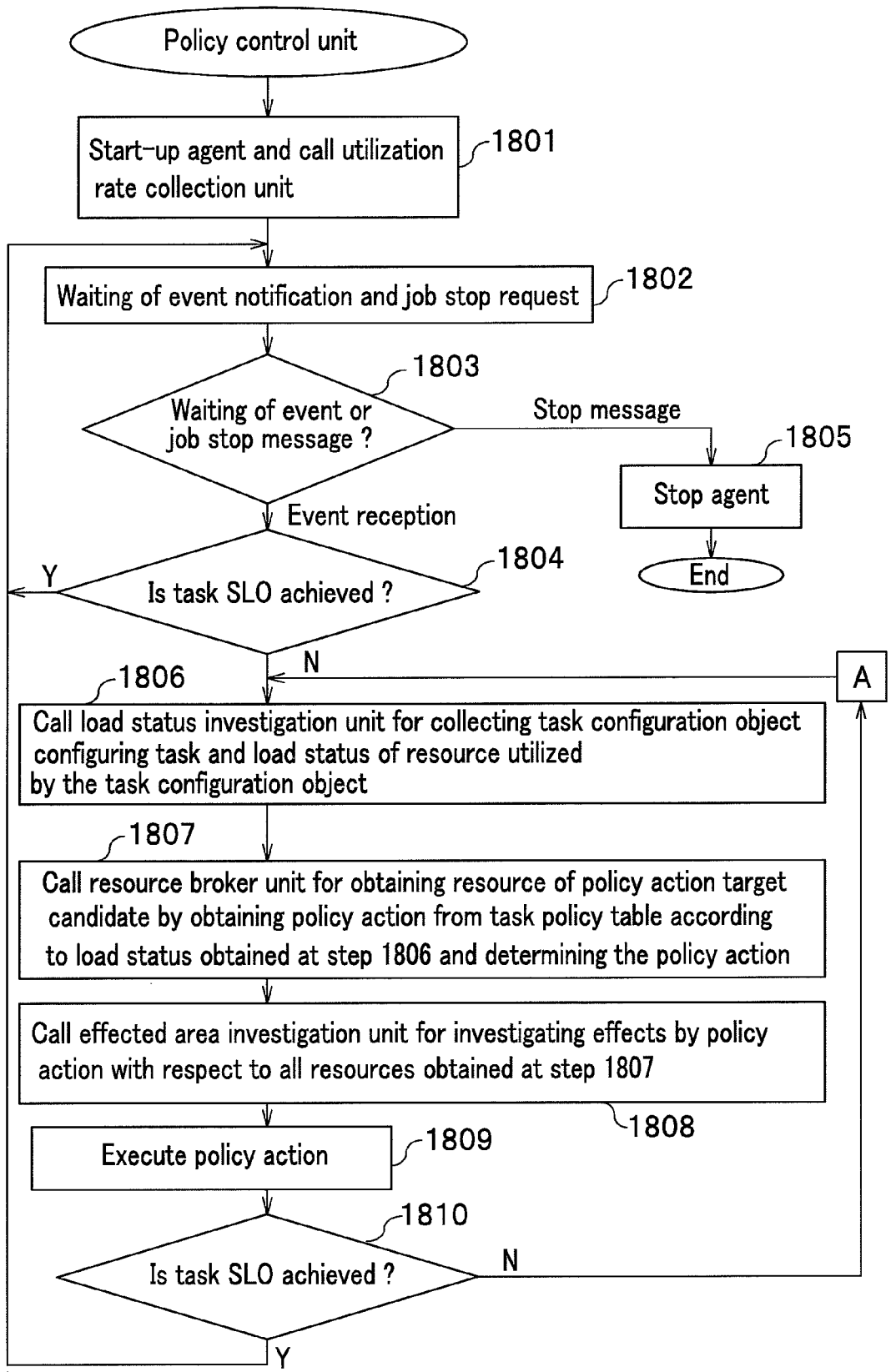
FIG. 18 is a flowchart showing a processing procedure in a policy control unit.

Next, a flowchart in FIG. 18 shows a processing procedure in the policy control unit 404. It is a processing for executing a policy execution control of a task application.

A first processing is to start up the agent 104 (Step 1801) for monitoring whether or not the task application is in an unusual condition, subsequently, calls the utilization rate collection unit 415 for obtaining a utilization rate of a resource of a task configuration object configuring the task application, then, waits for a notification of an event message from the agent 104, or a notification of a stop message of a job from the task application control unit 403 (Step 1802). Meanwhile, in the embodiment, the event message from the agent 104 is the event message of an overload status (an event message of troubles will be explained separately).

Figure 19:
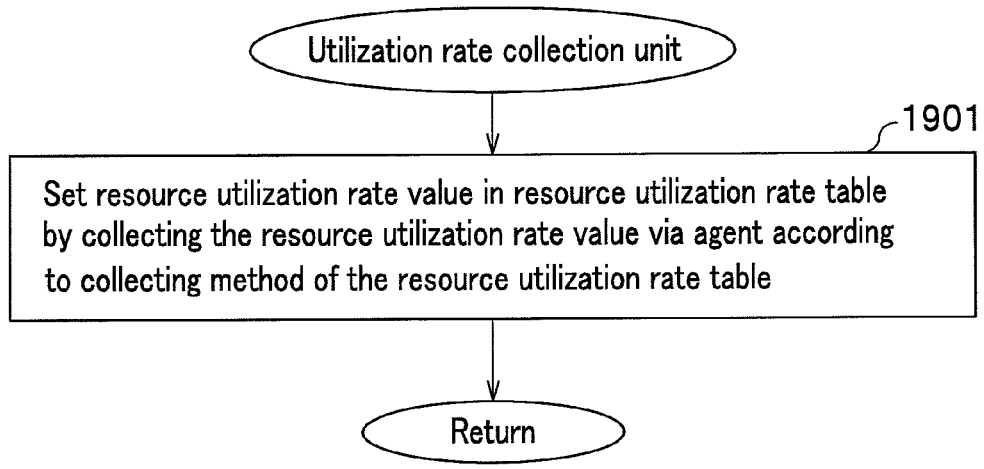
FIG. 19 is a flowchart showing a processing procedure in an utilization rate collection unit.

Here, a flowchart shown in FIG. 19 is a processing procedure in the utilization rate collection unit 415. The utilization rate collection unit 415 is started up by a calling of the policy control unit 404, and obtains a utilization rate (Step 1901) of each sub-resource of a resource which is utilized by a task configuration object of a task application through the agent 104, according to acquisition methods of the "Average utilization rate in one hour" 1208, "One day/One week utilization rate" 1209, "Total time utilization rate" 1210, and "Maximum utilization rate" 1211, with respect to the "CPU", "Memory", "Disc volume", "Printer support", and "Network resource", which are sub-resource type 1205 of the resource utilization rate table 410 (refer to FIG. 12). Here, the utilization rates are obtained based on the resource utilization rate table 410 (refer to FIG. 12). However, a utilization rate of other monitoring items can also be obtained.

Returning to FIG. 18, when a stop message of a job is notified from the task application control unit 403 ("Stop request" in Step 1803), the agent 104 is stopped and the processing ends (go to "End" from Step 1805). When an event message is notified from the agent 104 ("Event reception" in Step 1803), it is evaluated whether the SLO (Service Level Object) of a service provided by the task application is achieved or not (Step 1804).

When the SLO is achieved ("Y" in Step 1804), the processing returns again to Step 1802 of the wait state of a job by ignoring the notification of the event message. When the SLO is not achieved ("N" in Step 1804), the load status investigation unit 408 is called for obtaining a resource utilization rate of a task configuration object configuring the task application (Step 1806).

Figure 20:
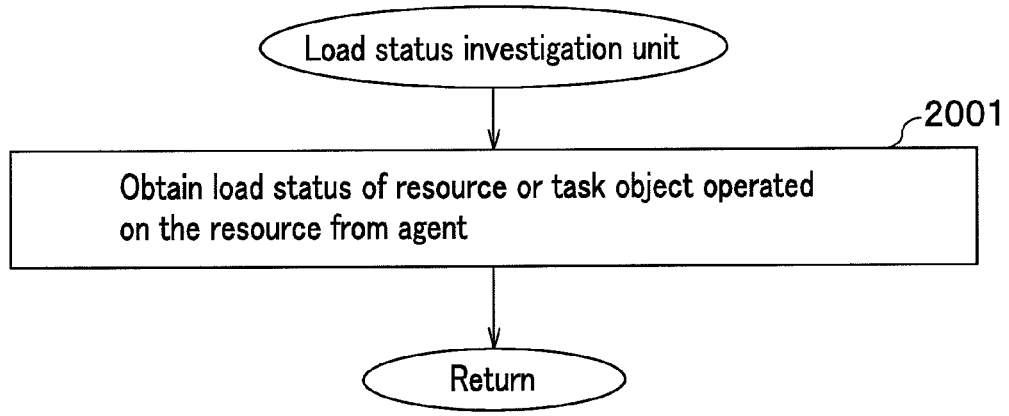
FIG. 20 is a flowchart showing a processing procedure in a load status investigation unit.

Here, a flowchart shown in FIG. 20 is a processing procedure in the load status investigation unit 408. The load status investigation unit 408 is started up by a calling of the policy control unit 404, and executes a processing for obtaining a load status of a resource or a load status of a task object on the resource from the agent 104, by obtaining a utilization rate of each sub-resource (for example, "CPU", "Memory", "Disc volume", "Printer support", and "Network resource") of a resource which is utilized by a task configuration object of an indicated task application through the agent 104 (Step 2001).

Meanwhile, as described above, since operations of the load status investigation unit 408 and utilization rate collection unit 415 are substantially identical, both units may be combined in one unit. Then, "Utilization rate collection unit" corresponds to both the investigation unit 408 and utilization rate collection unit 415.

Returning to FIG. 18, at Step 1806, according to a detailed load status of the task application (task configuration object) obtained from the load status investigation unit 408, a policy action 1003 (specific countermeasure processing in policy control processing) to be executed is obtained from the task policy table 405 (refer to FIG. 10), and also the resource broker 406 is called for obtaining a resource which is a candidate of a policy action target (Step 1807).

Figure 21:
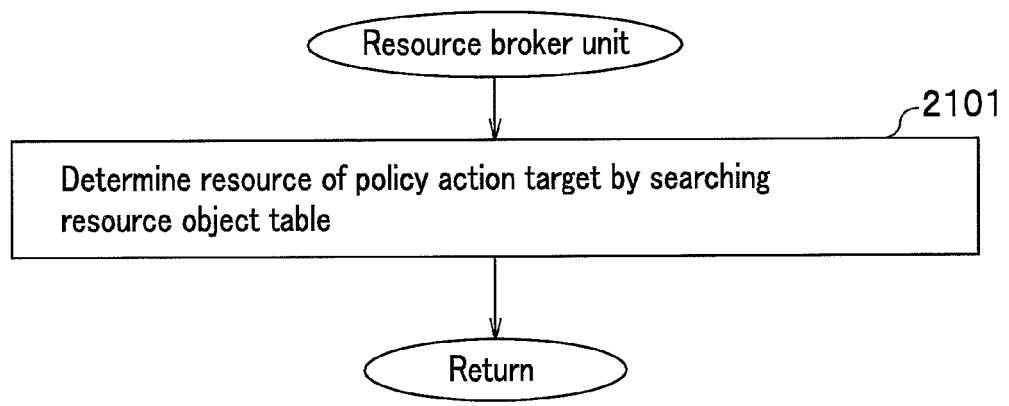
FIG. 21 is a flowchart showing a processing procedure in a resource broker unit.

Here, a flowchart shown in FIG. 21 is a processing procedure in a resource broker unit 406. The resource broker unit 406 is started up by a calling of the policy control unit 404 and retrieves of a resource of a policy action target from the resource object table 407 based on an assignment by an invoker, and determines the resource (Step 2101). If a system is in an overload status, the system determines that a countermeasure is required by a scale out for adding a resource. As a resource of a scale out target, the resource which is shared by another task application is preferentially selected for effective utilization of resources (Further, it is possible to set a detailed condition which includes a specific attribute as a collateral condition of the resource to be retrieved. The content of the attribute must be described in the policy action description). Here, a resource number of a policy action target is not limited to one, but more than one of resources may be listed up as the candidates.

Returning to FIG. 18, in the resource broker unit 406, when a target resource is determined, an effected range investigation unit 409 is called for verifying effects on other task applications by executing the policy action (Step 1808). Meanwhile, a processing of the effected range investigation unit 409 will be described later.

In the processing of the effected range investigation unit 409 described later, if the effects by the policy action exist, the processing moves to "A" and steps are repeated from Step 1806 for obtaining a second or later candidate of the policy action description.

If the effects do not exist, the processing is continued and the policy action is executed (Step 1809). Then, it is determined whether or not the SLO is achieved (Step 1810).

If the SLO is not achieved ("N" in Step 1810), the processing from Step 1806 to Step 1810 is repeated.

On the other hand, if the SLO is achieved ("Y" in Step 1810), the processing will become the wait state again in Step 1802 waiting for a notification of an event message from the agent 104 or a notification of a job stop request from a task application control unit 403.

An achievement of the SLO may be verified for not only the task application which executed the policy action, but also other task applications sharing the resource for confirmation.

Meanwhile, if a policy action at Step 1809 is completely correct, it is unnecessary to verify the achievement of the SLO after the policy action. Then, it may be possible not to execute the processing at Step 1810.

Here, if a policy action is executed correctly, the policy control unit 404 updates a task configuration table 412 according to the executed policy action. As an example, the example of information stored in the task configuration table 412 before and after the execution of the policy action is shown in FIG. 22. The task configuration table 412 indicated by a reference number 2201 is the table before a change by the execution of the policy action, and the table indicated by a reference number 2202 is the table after the change by the execution of the policy action.

The task configuration table 412 indicated by the reference number 2202 shows that since a countermeasure by a scale out of the task configuration object "A0000001" is implemented as a policy action, the "A0000001" utilizes two resources and a load dispersion balance rate 1713 between the two resources are set at 50%. One of the resource is "R0000001" and the other is given a resource ID as the policy action target as shown by a reference number 2203 (in the figure, shown with "Rxxxxxxx" as a temporary resource).

Figure 23:
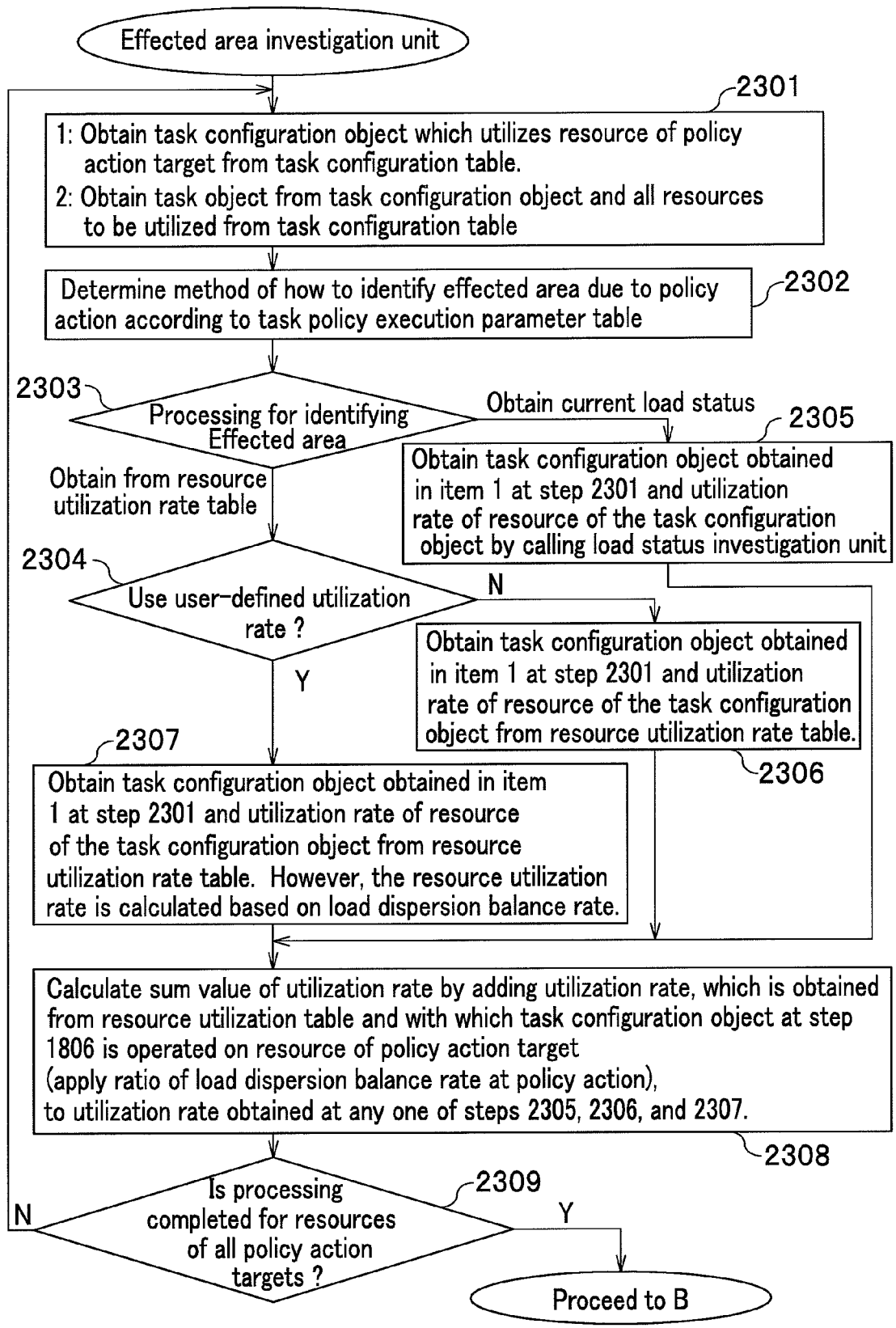
FIG. 23 is a flowchart showing a processing procedure in an effected range investigation unit.
Figure 24:
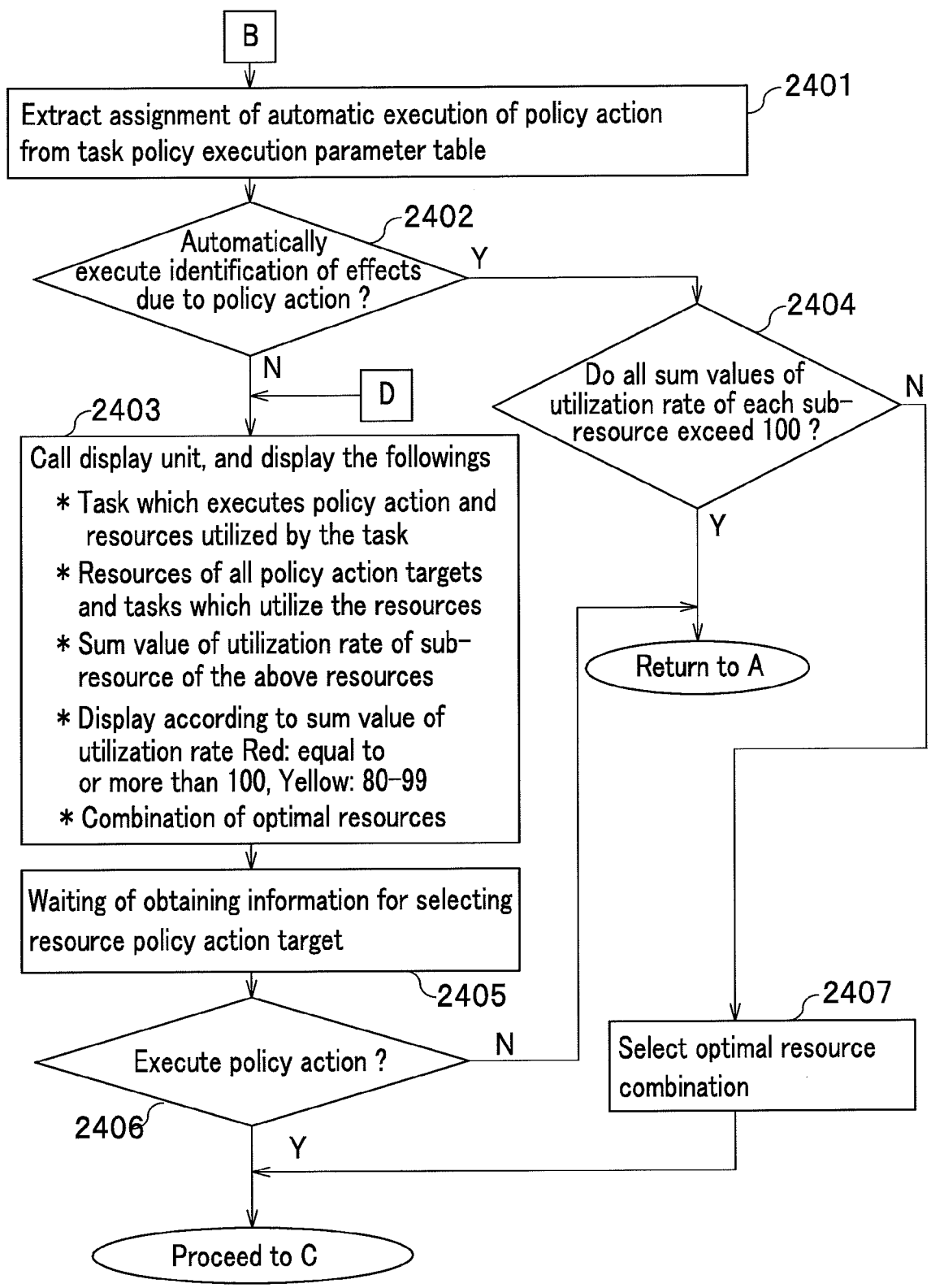
FIG. 24 is a flowchart showing a processing procedure in an effected range investigation unit.
Figure 25:
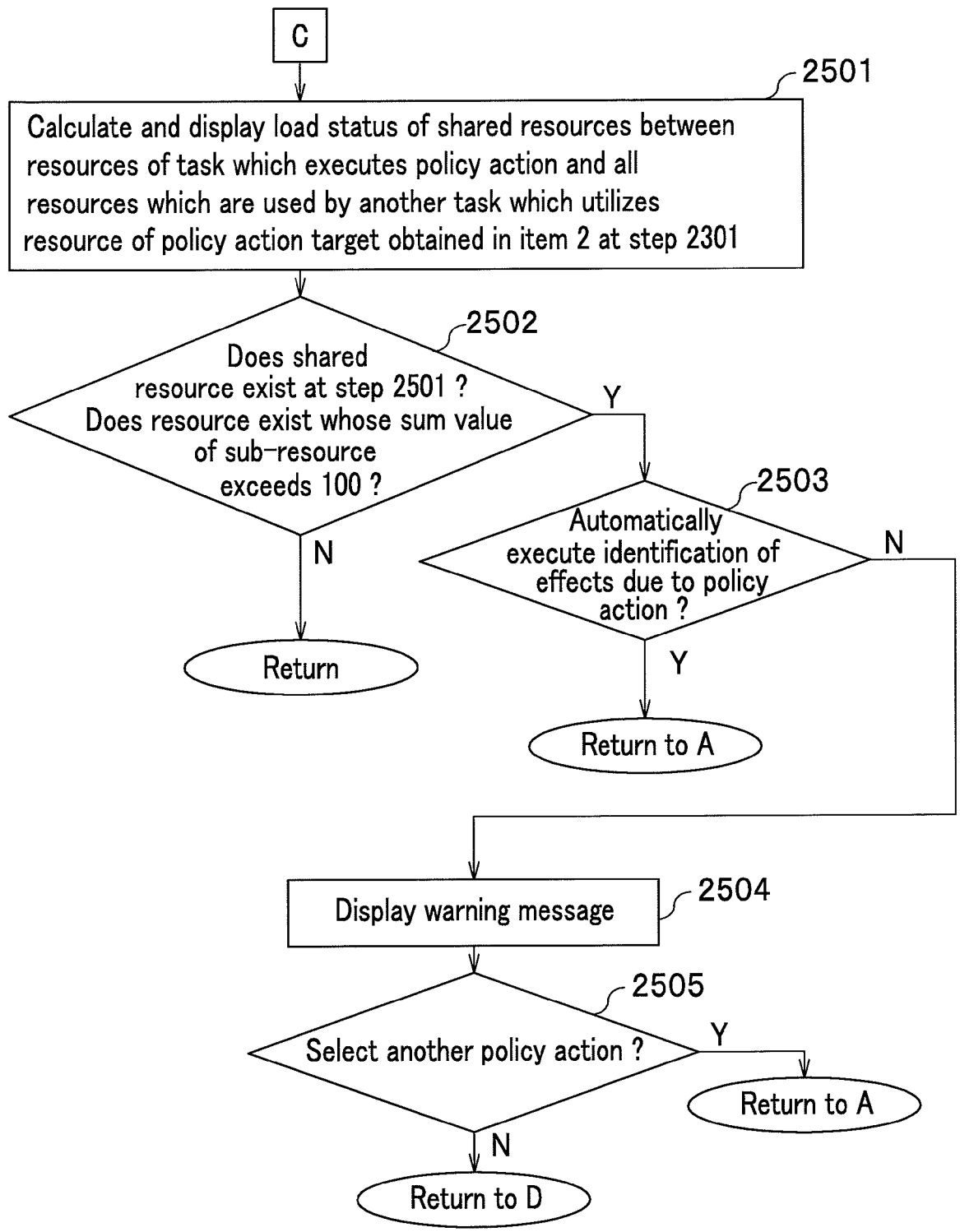
FIG. 25 is a flowchart showing a processing procedure in an effected range investigation unit.

Next, flowcharts in FIG. 23, FIG. 24, and FIG. 25 are processing procedures in the effected range investigation unit 409. The effected range investigation unit 409 is started up by a calling (Step 1808 in FIG. 18) of the policy control unit 404 and investigates whether or not other task applications are effected by adding a resource as a policy action target.

First, a task configuration object utilizing a resource which is a policy action target is obtained from the task configuration table 412. Then, a task object configured with the task configuration object is obtained from the task configuration table 412. Next, task configuration objects configuring the task object and resources which are utilized by the task configuration object are obtained from the task configuration table 412 (Step 2301).

That is, a task configuration object, which is operated on a resource of a policy action target, of a task application and all resources used by the task application are obtained. Meanwhile, if a plurality of task configuration objects which use the resource exist, the above processing is implemented for all of the task configuration objects.

Next, a method for identifying an effected range by a policy action is obtained from a task policy execution parameter table 414 (Step 2302). When a utilization rate is obtained based on a current load status ("Acquisition of current load status" at Step 2303), a utilization rate of each sub-resource, which is utilized by a task configuration object of a resource which is a policy action target obtained at Step 2301, is obtained (Step 2305) by calling the load status investigation unit 408 (refer to FIG. 20). A target sub-resource must be a sub-resource which is utilized by the task configuration object, and it is obtained from the sub-resource type (1404) corresponding to the task configuration object defined by the task configuration object attribute table (refer to FIG. 14).

On the other hand, when a utilization rate is obtained from the resource utilization table 410 ("Acquisition from resource utilization rate table" at Step 2303) and the rate is obtained from an item of "Utilization rate by utilization rate measurement unit" 1213 (refer to FIG. 12) of the resource utilization table 410 ("N" in Step 2304), a utilization rate of each sub-resource, which is utilized by the task configuration object of the resource which is the policy action target obtained at Step 2301, is obtained by a combination of the task configuration object and resource from one of items or all of items of the "Average utilization rate in one hour" 1208, "One day/One week utilization rate" 1209, "Total time utilization rate" 1210, and "Maximum utilization rate" 1211 of the "Utilization rate by utilization rate measurement unit" 1213 on the resource utilization table 410. With the above, the task configuration object obtained at Step 2301 and the utilization rate of the resource are obtained from the resource utilization rate table 410 (Step 2306). A sub-resource to be a target must be the sub-resource utilized by a task configuration object. It is obtained from sub-resources corresponding to the task configuration object defined by the task configuration object attribute table (refer to FIG. 14).

When a utilization rate is obtained from the resource utilization rate table 410 ("Acquisition from resource utilization rate table" at Step 2303) and the rate is obtained from the item of "User-defined utilization rate" 1212 of the resource utilization rate table 410 ("Y" in Step 2304), a utilization rate of each sub-resource of the task configuration object of the resource, which is the policy action target obtained at Step 2301, is obtained by a combination of the task configuration object and resource from one of items or all of items of the "User-estimated utilization rate" 1206 and "Date and time specified peak utilization rate" 1207 of "User-defined utilization rate" 1212 on the resource utilization table 410. However, the obtained utilization rate must be a value based on a rate of the load dispersion balance rate 1713 of the task configuration object 1711 stored in the task configuration table 412 (Step 2307). Here, a sub-resource to be a target must be the sub-resource utilized by the task configuration object, and it is obtained from the sub-resource type (1404) corresponding to the task configuration object defined by the task configuration object attribute table (refer to FIG. 14).

Next, a sum of a utilization rate of a sub-resource is obtained by obtaining the utilization rate of each of the sub-resources from the "User-estimated utilization rate" 1206 of the resource utilization rate table 410 when a task configuration object which is selected at Step 1806 utilizes a resource of a policy action target (However, it is also possible to obtain the utilization rate by other utilization rates other than the "User-estimated utilization rate" by holding the processing on the task policy execution parameter table 414 (refer to FIG. 15) as at Step 2302), and by adding the obtained utilization rate of each of the sub-resources to the utilization rate of the sub-resource, which is same with each of the sub-resources, obtained at Step 2305, or Step 2306, or Step 2307, respectively (Step 2308).

Here, for example, a summation is implemented for "CPU", "Memory", "Disc volume", "Printer support", and "Network resource" respectively, by considering a difference of resource functions utilized by each task. However, a sub-resource to be a target must be the sub-resource utilized by the task configuration object. It is obtained from the sub-resource type 1404 corresponding to the task configuration object defined by the task configuration object attribute table (refer to FIG. 14).

Here, with respect to a utilization rate of a sub-resource of a task configuration object which is obtained at Step 1806, a rate of a load dispersion balance rate which is set in a policy action to be executed at Step 1807 is applied to the utilization rate. For example, when a countermeasure is performed by a scale out, the load dispersion balance rate of the processing should be set according to an added resource number, and the utilization rate is calculated by the rate of the load dispersion balance rate. For example, when the utilization rate of a "CPU", which is one of the sub-resources of the resource utilization table, is 60% and the load dispersion balance rate is 50%, then, the utilization rate of the "CPU" becomes 30%.

In addition, when there exist a plurality of candidates of a resource which is a policy action target obtained at Step 1807, the processing from Step 2301 to Step 2308 is repeatedly executed as many as a resource number. Therefore, it is evaluated whether or not the processing has been completed for all resources which are targets of the policy action (Step 2309) The processing returns to Step 2301 until the processing is completed for all resources. When utilization rates of all resources are obtained, the processing proceeds to a flowchart in FIG. 24, which is a processing of "B".

Next, as a first processing of the flowchart shown in FIG. 24, an assignment of automatic execution (policy action is executed automatically) for confirming effects of a policy action on other task applications is extracted from the task policy execution parameter table 414 (Step 2401). Here, when the policy action is executed automatically ("Y" at Step 2402), it is evaluated whether all sums, which are obtained at Step 2308 (refer to FIG. 22), of a utilization rate of each sub-resource exceed "100" (Step 2404) or not.

When the all sums of the utilization rate of each sub-resource exceed "100" ("Y" at Step 2404), the processing returns to "A" of the flowchart which is executed by the policy control unit 404 in FIG. 18, and a second or later policy action is executed.

Meanwhile, in the embodiment, it was evaluated whether or not a sum of a utilization rate exceeds "100" at Step 2404. However, the value is a threshold which can be set arbitrarily. Therefore, for example, an administrator of the system may determine the value, considering a system safety.

In addition, when a policy action for a plurality of task configuration objects is required, and when a plurality of resources are listed up as the candidates at Step 1807, the processing becomes as follows. A resource, whose sum of a utilization rate of each sub-resource does not exceed "100" and also which has a minimum sum value of the utilization rate of the sub-resource which is set in the preferential sub-resource type 1405 (for example, "CPU" if the resource is a Web server) of the task configuration object attribute table 413 (refer to FIG. 14), is selected as an optimal resource, thereby resulting in a selection of an optimal resource combination (Step 2407). Then, the processing proceeds to a flowchart in FIG. 25, that is, a processing "C".

Figure 26:
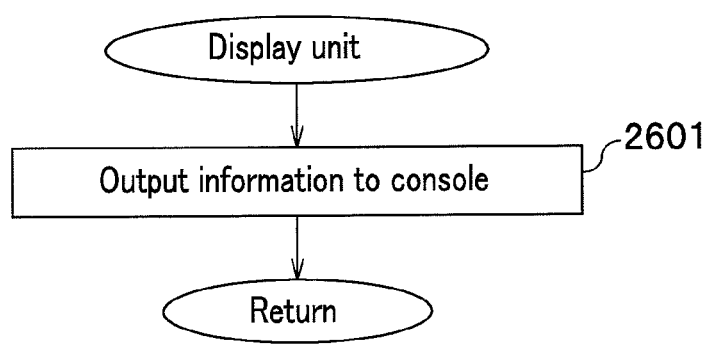
FIG. 26 is a flowchart showing a processing procedure in a display unit.

In addition, when a policy action is not executed automatically ("N" at Step 2402), an effected range due to the policy execution is displayed by calling a display unit 411 (Step 2403). Here, a flowchart shown in FIG. 26 is a processing procedure in the display unit 411. The display unit 411 outputs information for displaying it on the console 102 (Step 2601).

Here, contents of a display of the display unit 411 are, first; a task object of a task application which executed a policy action, a task configuration object, and a resource which is utilized by the task configuration object, second; all resources and attributes of the resources which are candidates of a policy action, a task object of a task application which utilizes the resources, a task configuration object, and an attribute of the task object. In the displays of the first and second task objects, configurations of the task applications are displayed by referring to the task configuration object attribute table 413 (refer to FIG. 14). In addition, a relation between a task object and a resource is displayed by referring to the task configuration table 412 (refer to FIG. 21).

Further, the contents displayed by the display unit 411 are, third; a sum of utilization rate of each sub-resource of all resources which are policy action targets, fourth; a display (for example, Red: for more than "100", Yellow: for "80 to 99") corresponding to the sum value of the utilization rate of each sub-resource of the resource displayed in the third. It may be possible to display only a sub-resource shown in the sub-resource type 1404 of the task configuration object attribute table (refer to FIG. 14). Further, fifth; in a display of resources in the second, an order change of a resource order which is based on a preferential item of the task application and a priority are displayed according to the sum value of the utilization rate of each sub-resource of the resource displayed in the third, as well as a display order based on an attribute such as a name of the resource. Since utilization rates of resources (sub-resources) are not equal depending on a task application, a preferential display item is set in advance (for example, "CPU" is set if the resource is a Web server.) in the preferential sub-resource type 1405 of the task configuration object attribute table 413 (refer to FIG. 14).

Figure 27:
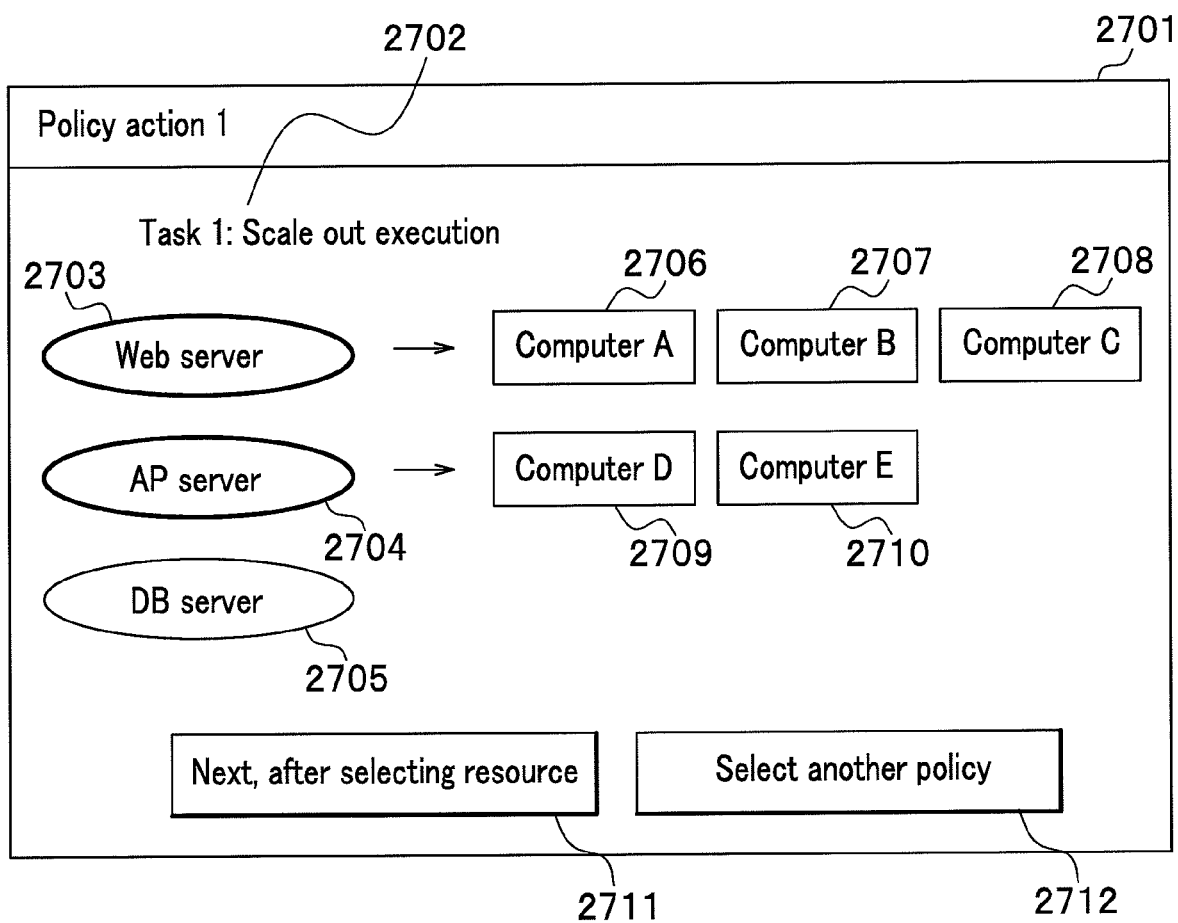
FIG. 27 is an illustration showing an example of a screen display displayed by a display unit.
Figure 28:
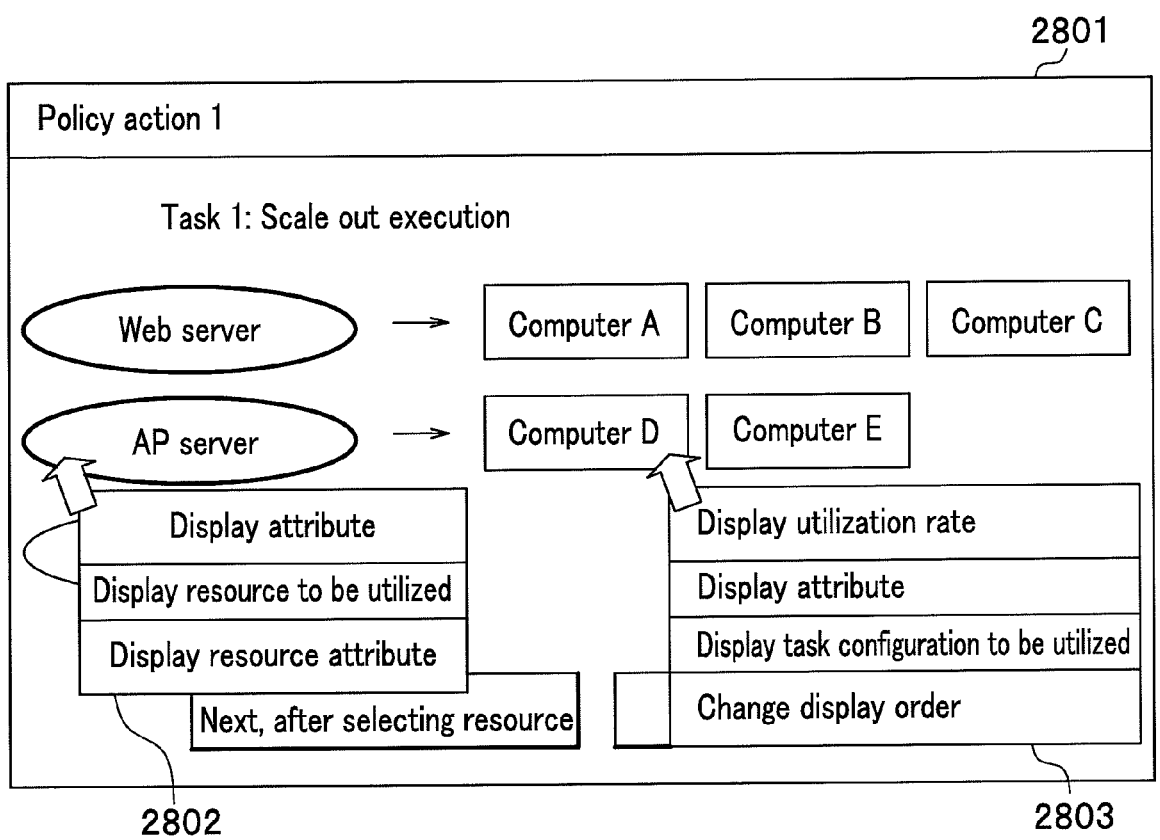
FIG. 28 is an illustration showing an example of a screen display displayed by a display unit.

Meanwhile, examples of the display are shown in FIG. 27 and FIG. 28. The explanations will be described later.

Next, when the above is displayed, the processing becomes a wait state of waiting for information whether or not a policy action can be executed, and waits for acquiring information for selecting any resource, which is selected by referencing the display at Step 2403, of a policy action target (Step 2405). Then, when the information for selecting a resource is acquired ("Y" at Step 2406), the processing proceeds to a flowchart in FIG. 25, that is, a processing "C", for executing the policy action. When the information is not acquired ("N" at Step 2406), the processing returns to "A" of the flowchart in FIG. 18, and a second or later candidate of the policy action is executed.

Next, as a first processing in the flowchart shown in FIG. 25, a utilization rate of each sub-resource of a shared resource is obtained (Step 2501) from all resources used by a task application which uses a resource obtained in the processing at Step 2405 and Step 2407 in the flowchart shown in FIG. 24 and all resources used by the task application which has executed the policy action, then, a load status of the shared resource is obtained (Step 2501). In addition, the obtained load status may be displayed on the console 102 by calling the display unit 411.

Figure 33:
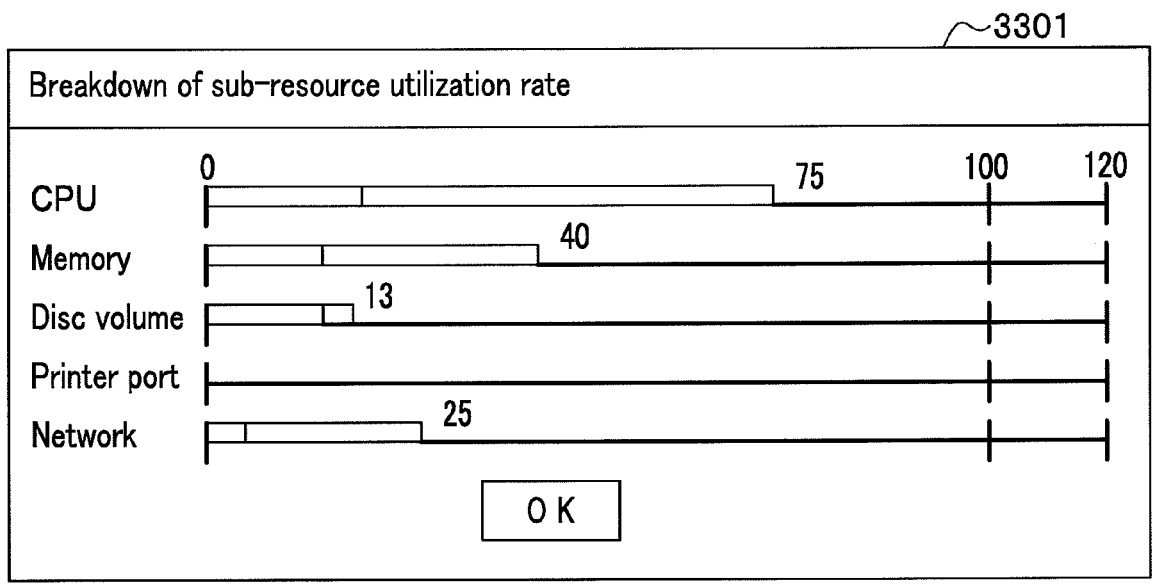
FIG. 33 is an illustration showing an example of a screen display displayed by a display unit.

Here, a task object is obtained from a resource by referring to the task configuration table 412 (refer to FIG. 22) as with the above. In addition, utilization rates are obtained from the utilization rate obtained at Step 1806 of the flowchart shown in FIG. 18 and from the resource utilization rate table 410 in a manner similar to FIG. 23, respectively. The present processing is for confirming whether or not there are effects on a shared resource by execution of the policy action. When an automatic policy action is not set, an obtained utilization rate may be displayed on the console 102 by calling the display unit 411. An example of the display is shown in FIG. 33, and the explanation will be described later.

Next, when a shared resource exists at Step 2501, and there exists a sub-resource whose sum of a utilization rate by sub-resource exceeds "100" ("Y" at Step 2502), and also when an automatic policy action is set ("Y" at Step 2503), the processing returns to "A" of the flowchart shown in FIG. 18 and a second or later policy action is executed. When the automatic policy action is not set ("N" at Step 2503), a warning message to notify that a policy action is not correctly executed with the present setting is displayed by calling the display unit 411 (Step 2504). Then, it is evaluated whether or not a second or later candidate of the policy action should be executed (Step 2505). When the second or later candidate of the policy action is to be executed, the processing returns to "A" of the flowchart shown in FIG. 18, and when not executed, the processing proceeds to "D" in FIG. 24, and a resource of the policy action target is selected again.

When there is no resource whose sum of a utilization rate obtained at Step 2501 exceeds "100" ("N" at Step 2502), the processing returns to Step 1809 of the flowchart shown in FIG. 18, and a policy action is executed.

<Evaluation by Date and Time Specified Utilization Rate>

In the resource utilization rate table 410 shown in FIG. 12, as an example of "Date and Time specified peak utilization rate" 1207, a date and time specified utilization rate can be set, and contents of the setting are shown in reference number 1201 as an example. Here, it is shown that a utilization rate is high at a certain time, on a day, on a day of the week, and for a period of time. A format shown here is an example, and by using a separator with a different symbol, for instance, it is possible to set a plurality of periods and a plurality of times. Then, the utilization rate is evaluated by synchronizing a time for the evaluation with a period of time when the task system utilizes the resource. When the period of time is overlapped with that of in the table, a utilization rate set in the table is applied. When the period of time is not synchronized, the utilization rate is treated to be "0"% (zero).

In addition, as a future evaluation method of a utilization rate, when it is known that the task application uses a sub-resource with a high utilization rate in a future, a utilization of the resource can be determined by evaluating a sum of the utilization rate after determining whether or not a period of time with the high utilization rate in a future and that of a specified day and time in the table synchronize.

<Example of Screen Display>

An example of a screen display at Step 2303 of the flowchart shown in FIG. 23 is shown in FIG. 27. A screen indicated by a reference number 2701 shows a status in which a policy action by a scale out is going to be executed because an overload status is detected in a task application of a "Task 1".

According to FIG. 27, there exist a "Web server" 2703, "AP server" 2704, and "DB server" 2705 as configuration objects configuring the "Task 1" 2702. These are shown on the left side of the screen indicated by the reference number 2701. On the left side, a list of the task configuration objects configuring the task is displayed. Further, a task configuration object in which a policy action is required is displayed with emphasis for easy recognition (In FIG. 27, "Web server" 2703 and "AP server" 2704 are displayed with emphasis).

In addition, on the right side of the screen indicated by the reference number 2701, icons of a list of resources of additional targets are shown. Here, scale outs are going to be executed for the "Web server" 2703 and "AP server" 2704, respectively, which configure the "Task 1". The screen shows that a "Computer A" 2706, "Computer B" 2707, and "Computer C" 2708 are additional candidates for the "Web server" 2703, and a "Computer D" 2709 and "Computer E" 2710 are additional candidates for the "AP server" 2703.

In the screen indicated by the reference number 2701, the resources (for example, 2706, 2707, and 2708) are ordered from the left to the right in order of increasing a sum value of a utilization rate of a preferential sub-resource type ("CPU", "Memory", and "Disc", for instance) which is set for each task configuration object. This shows that a resource on the left side is an optimal resource by a preferential display of a resource which has a lower sum value of the utilization rate in consideration of stable operation of the task.

Further, when the sum value of the utilization rate of a sub-resource exceeds "100", or close to "100", the icon may be displayed with red or yellow, or a shape of the icon may be changed.

In addition, a display order may be changed based on some attribute of a resource which is available from the resource object table 407 (a display order can be set in advance in the task policy execution parameter table 414 (refer to FIG. 15)).

Then, in the screen indicated by the reference number 2701, a resource which is a policy action target is selected by selecting any one of icons (2706, 2707, 2708, 2709, and 2710) indicating the resources.

For example, in a case of the "Web server" 2703, any one of the resources "Computer A" 2706, "Computer B" 2707, and "Computer C" 2708 is selected, and in a case of the "AP server" 2703, one of the "Computer D" 2709 and "Computer E" 2710 is selected. At a bottom of the screen, buttons of "Next, after selecting a resource" 2711 and "Select another policy" 2712 for selecting another policy are arranged for selecting the next control. When the processing proceeds to the next by selecting a resource of a policy action target, the button of "Next, after selecting a resource" 2711 is selected; and when another policy is executed, the button of "Select another policy" 2712 is selected.

Next, FIG. 28 is, in the screen 2701 shown in FIG. 27, an example of a screen for popping up an icon indicating a task configuration object or detailed information corresponding to an icon of a resource of a policy action target.

In a screen 2801 shown in FIG. 28, it is shown that, for example, the "Web server" can display attribute information of an object, a resource used by a task configuration object, and attributes of the resource, as shown in a reference number 2802. In addition, it is also shown that the "Computer D", which is an icon of a resource, can display a sum value of a utilization rate of each sub-resource as a breakdown of a utilization rate of a resource, attribute information of the resource, and configuration information of a task configuration object using the resource and a task object, and can instruct a change of a display order.

A pop-up display of the above is performed by, for example, displaying available menus by clicking an icon with a right click of a mouse and the like, and a menu is selected.

In addition, further detailed information can be displayed by using another pop-up window and the like (Pop-up screen of the breakdown of the utilization rate is shown in FIG. 33 as the example; the explanation will be described later)

Figure 29:
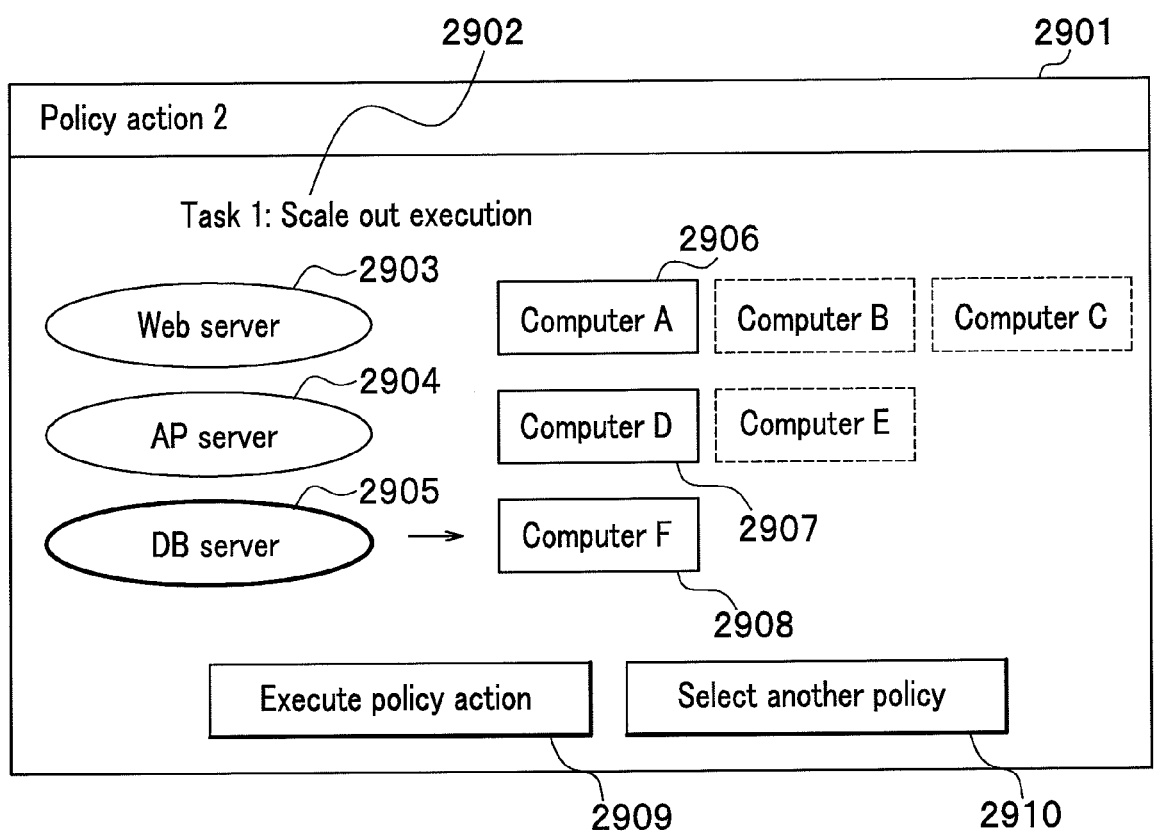
FIG. 29 is an illustration showing an example of a screen display displayed by a display unit.

FIG. 29 shows a screen displaying a utilization rate of a shared resource by a task application which uses a resource of a policy action target selected in FIG. 27 or FIG. 28 and a task application which has executed the policy action.

In the screen 2901 shown in FIG. 29, a task configuration object using the shared resource is shown by highlighting an icon of the task configuration object on the left, and resources to be shared are indicated with icons of the resources on the right. For example, as a policy name in operation and configuration objects configuring the "Task 1" 2702, there are icons of a "Web server" 2903, "AP server" 2904, and "DB server" 2905, and they are displayed on the left of the screen 2901. Here, the "DB server" 2905 is displayed with highlight as a task configuration object utilizing the shared resource.

In addition, a "Computer A" 2906 and "Computer D" 2907 are displayed with emphasis as resources of policy action targets on the right side of the screen 2901, and resources other than the targets are displayed lightly (In FIG. 29, a "Computer B", "Computer C", and "Computer E" correspond to these resources) In addition, it is shown that a "Computer F" 2908 is newly displayed as a shared resource.

Further, at a bottom of the screen 2901, buttons of "Execute policy action" 2906 and "Select another policy" 2910 for executing the next control are arranged. When a policy action is executed, the button of the "Execute policy action" 2906 is selected; and when another policy is executed, the button of the "Select another policy" 2910 is selected. In the screen 2901, as in the screen 2801 shown in FIG. 28, for example, attributes and the like can be displayed from a menu by a right click of each icon. As described above and shown in FIG. 27 to FIG. 29, the processing can proceed to the next after confirming a utilization rate of a shared resource by a display screen (2701, 2801, and 2901) according to the embodiment.

<Specific Operation Example>

An example of actual operation is described below when load dispersion by a scale out is executed as a policy action.

There is a model "G0000001" indicating a task application as shown in FIG. 7, and the model "G0000001" is configured with task configuration objects "A0000001" 702, "A0000002" 703, and "A0000003" 704. These task configuration objects configure a Web application of three-level layers as the task ID 1401 of the task configuration object attribute table 413 shown in FIG. 14 indicates three entries of "G0000001". When a job of the task application is executed according to the flowchart shown in FIG. 16, the job is executed in order of Step 1601, Step 1602, and Step 1603. In this case, assignments of execution units of the task configuration objects are implemented as follows. As the task ID 1710 of the task configuration table 412 shown in FIG. 17 shows three entries of the "G0000001", a task configuration object of the "A0000001" indicated by the reference number 1714 is executed in the resource "R0000001"; a task configuration object of the "A0000002" indicated by the reference number 1715 is executed in the resource "R0000002"; and a task configuration object of the "A0000003" indicated by the reference number 1716 is executed in the resource "R0000006".

Subsequently, according to the flowchart shown in FIG. 18, a policy control is executed, and a monitoring of a status change of a task application and an acquisition of a utilization rate of a sub-resource for each task configuration object are implemented. When an overload occurs after a while, an event message is received from the agent 104 (Step 1803). From the event message, it is found that the SLO of the task can not be achieved at Step 1804, and as a result, utilization rates of resources (sub-resources) which are utilized by the task configuration objects, "A0000001", "A0000002", and "A0000003" are acquired by a processing at Step 1806.

In addition, considering a status of the overload in processing at Step 1807 and the utilization rates of the resources (sub-resources) obtained at Step 1806, a policy to be executed is obtained from the task policy table 405 shown in FIG. 10. A description content of the obtained policy is to execute a scale out of the task configuration object "A0000001", and a resource of the execution target is obtained by calling the resource broker unit 406. Here, two resources, "R0000007"

and "R0000010" are obtained as a candidate for the task application object "A0000001" (meanwhile, according to a status of the overload, a policy control by a scale out may be executed for the task configuration objects "A0000002" and "A0000003").

Next, with respect to one obtained resource candidate or more than one, the processing shown in FIG. 23 to FIG. 25 is executed by calling the effected range investigation unit 409 for investigating an effected range by a policy action as a processing at Step 1808.

First, as a processing at Step 2301 of the flowchart shown in FIG. 23, task configuration objects which use resources "R0000007" and "R0000010" are obtained. For this purpose, the task configuration table 412 (refer to FIG. 22) is retrieved by assuming that "R0000007" and "R0000010" are keys for the retrieval. As a result, task configuration objects, "A0000008" and "A0000012" are obtained. In addition, all resources which are utilized by the task configuration objects are acquired at the same time.

Here, the effected range is investigated by using "Average utilization rate in one hour" 1508 of the resource utilization rate 410 shown in FIG. 12 according to a processing flow of Step 2302, Step 2303, and Step 2304, and a utilization rate of each sub-resource is obtained from the resource utilization rate table 410 by combining the "R0000007" and "A0000008", and "R0000010" and "A0000012", as a processing at Step 2306.

Here, FIG. 30 and FIG. 31 are figures showing other examples of the resource utilization rate table 410. In the resource utilization rate table 410 shown in FIG. 30 and FIG. 31, the utilization rates of "R0000007" and "A0000008", and "R0000010" and "A0000012" are obtained from portions shown by reference numbers 3101 and 3102, respectively. Subsequently, as a processing at Step 2308, when a task application which executed a policy action is operated by using "R0000007" and "R0000010", a utilization rate of each sub-resource is obtained from the resource utilization rate table 410 by assuming that the load dispersion balance rate of the policy action is temporarily 50% (round after the decimal point to unit). A sub-resource to be a target is defined by the sub-resource type shown in the task configuration object attribute table (FIG. 14). In the present example, "CPU", "Memory", "Disc volume", "Printer support", and "Network resource" are defined.

In a case of "R0000007" in FIG. 30, the sub-resources are indicated by a reference number 3001, and "CPU" is 15%, "Memory" is 10%, "Disc volume" is 3%, "Printer support" is 0 (zero) %, and "Network resource" is 5%. In a case of "R0000010", they are shown by a reference number 3002, and "CPU" is 25%, "Memory" is 15%, "Disc volume" is 5%, "Printer support" is 0 (zero) %, and "Network resource" is 10%.

As a result, in the case of "R0000007", a sum value of a utilization rate can be obtained from portions indicated by the reference numbers 3001 in FIG. 30 and 3101 in FIG. 31. Also, in the case of "R0000010", a sum value of a utilization rate can be obtained from portions indicated by the reference numbers 3002 in FIG. 30 and 3102 in FIG. 31. For convenience of explanation, both cases of the "R0000007" and "R0000010" have been explained together. However, actually, a processing is individually executed from Step 2301 to Step 2308 for each resource.

Figure 32:
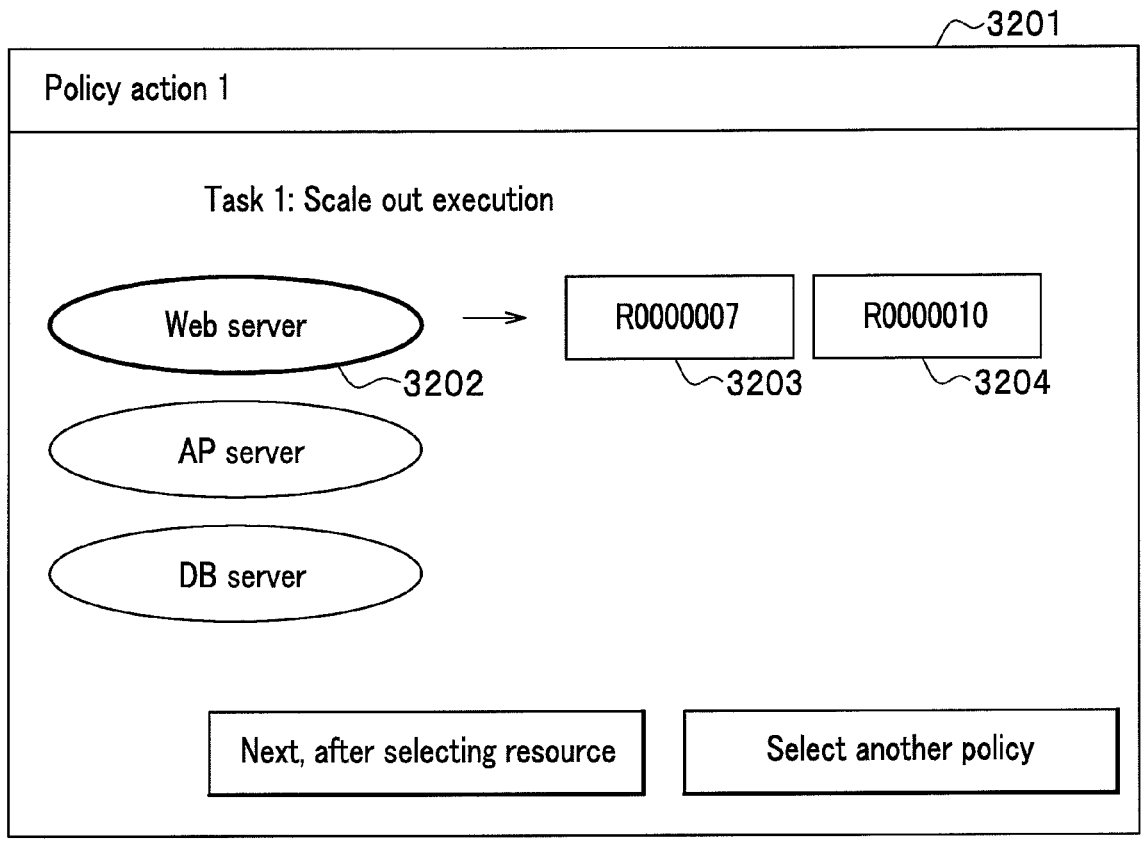
FIG. 32 is an illustration showing an example of a screen display displayed by a display unit.

Next, a screen is displayed at Step 2403 of the flowchart shown in FIG. 24 based on the sum value of the utilization rate of each sub-resource obtained in the above. As an example, an execution result is shown in FIG. 32. In a screen 3201 shown in FIG. 32, one of resources "R0000007" 3203 and "R0000010" 3204 is selected as a target resource of a policy action of "Web Sever" 3202 by evaluating a utilization rate, and the policy action is executed. If the sum value of the sub-resource exceeds 100%, the sub-resource can not be selected. For example, in a combination of "R0000010" and "A0000012", if the utilization rate of the sub-resource, "CPU", becomes equal to or more than 70%, "R0000010" 3204 can not be selected from the screen 3201 because the sum value of the utilization rate of the "CPU" exceeds 100%.

Here, in FIG. 33, an example of a screen is shown, which displays sum values of utilization rates of the resource "R0000007" 3203 shown in FIG. 32.

Next, in a processing at Step 2407 (refer to FIG. 24) in which a policy action is executed automatically, if a preferential sub-resource type 1405 in the task configuration object attribute table 413 (refer to FIG. 14) corresponding to characteristics of a task configuration object is set in advance, a preferential resource of a policy execution target can be selected automatically by evaluating a sum value of a utilization rate of a sub-resource (a resource whose utilization rate of each sub-resource does not exceed 100%, and which has a minimum sum value of the utilization rate with respect to an assigned sub-resource type, is selected).

Next, as a processing at Step 2501 (refer to FIG. 25), a utilization rate of each sub-resource of a shared resource, which is another resource utilized by a task application utilizing a resource of a policy action target, and also which is a resource utilized by, for example, "A0000002" or "A0000003" other than "A0000001", is evaluated. Then, after actually executing the policy action, the task configuration table 412 is updated (Example is shown in FIG. 22). In the embodiment, only the task configuration object "A0000001" is assumed to be a target of the policy action, however, the task configuration objects "A0000002", "A0000003", and the like may be set as the target of the policy action. Even if there is a resource candidate which is a target of a plurality of policy actions of the task configuration objects "A0000002", "A0000003" and the like, the sum value of the utilization rate of each sub-resource can be obtained, and the effects can be evaluated.

According to the aforementioned embodiment, in a task system configured with a plurality of resources, when a resource of a policy execution target is selected, the task system can provide information for easily selecting the resource which does not effect on other task applications which are concurrently in operation. Further, a resource which does not effect on other task applications can automatically be obtained, thereby a policy control can be executed automatically.

In addition, by evaluating a utilization rate of each sub-resource configuring a resource, it becomes possible to accurately evaluate effects on a sharing of the resource between tasks which have different types of processing execution each other.

With the above, a reliability of task services and an operation rate of the system can be improved.

Meanwhile, in the embodiment, a relation between a resource and a sub-resource corresponds to a relation between a computer system and "CPU", "Memory", and the like. However, the relation may correspond to, for example, between "Data center" and "Computer resource", "Blade server" and "Computer resource", and the like.

Hereinafter, a modified example of the first embodiment will be explained. In the modified example described below, since a main configuration is same as in the first embodiment, the explanation in detail will be omitted. Refer to FIG. 1 to FIG. 26, as needed.

Second Embodiment

A second embodiment is on a policy control for troubles other than an overload of the first embodiment.

In the first embodiment, a scale out due to an overload was exemplified. However, a policy control also can be executed by replacing a resource which is in trouble. This can be achieved by providing four reorganizations to the first embodiment.

First, set information in trouble in an event message of a status change. Second, obtain information which part of task configuration objects configuring a task application is in trouble at Step 1806 of the flowchart shown in FIG. 18. Third, apply a load dispersion balance rate of a task configuration object indicated by a reference number 2202 in the task configuration table 412 (refer to FIG. 22) when a utilization rate of a sub-resource is obtained, since a policy action for a trouble replacement is selected in selecting the policy action at Step 1807 as in the first embodiment. Fourth, entry a resource for replacing a trouble by deleting a resource which is originally utilized to update the task configuration table 412.

With the above, it becomes possible to apply the present invention to a policy control technology which can manage various events.

Third Embodiment

A third embodiment is on an automatic switching of a reference with respect to a resource utilization rate table.

In the first embodiment, a reference method of the resource utilization rate table 410 (refer to FIG. 12, FIG. 30, FIG. 31) is selected based on a parameter which is set for each task application in advance. Here, the resource utilization rate table 410 has both utilization rates set by a user in advance and actually measured. In an actual task, there is a possibility that a utilization rate actually measured is not set correctly at an initial stage of a task operation. Therefore, initially, a user-set utilization rate is used as the utilization rate, and when a reliable utilization rate, which is actually measured, is obtained after a stable operation of the system for a while, it becomes possible to use the reliable utilization rate.

For the above purpose, for example, it is necessary to set a switching of "User-defined utilization rate" 1212 and "Utilization rate by utilization rate measurement unit" 1213 in the resource utilization rate table 410 shown in FIG. 12, as well as setting an accumulated operation time of the task in the task policy execution parameter table 414 (refer to FIG. 15), in which a policy execution parameter is set by each task application. A switching processing is set below Step 2302 of the flowchart shown in FIG. 23 to achieve the above purpose.

In addition, the accumulated operation time of the task application is held in the task object table 402 (refer to FIG. 9) and task configuration object attribute table 413 (refer to FIG. 14) as one attribute. In accordance with the method described above, it becomes possible to apply a utilization rate which is closer to the utilization rate of the actual operation.

Fourth Embodiment

A fourth embodiment is on an automatic update of a resource utilization rate table.

In the first embodiment, when a change occurs in some attribute of a resource object which indicates an actual resource, information of a utilization rate of the resource object table 407 (refer to FIG. 11) and resource utilization rate table 410 (refer to FIG. 12) is automatically updated.

The manager 101 and agent 104 shown in FIG. 1 are always connected. When a configuration change of resources of the task server 106 occurs, an event message is notified to the manager 101 from the agent 104, and attributes 1102, 1103 of the resource object table 407 and utilization rates of the resource utilization rate table 410 are updated. For example, a change of a utilization rate by a configuration change due to replacement of a CPU chip for, for example, upgrading of "CPU" of the sub-resource is difficult (this is possible if a comparison table of a performance and the like are prepared) However, in a case of configuration change for upgrading, for example, a capacity of "Memory" or "Disc volume" of the sub-resource, an update of the utilization rate is possible according to a change of the capacity. With the above, a manual maintenance becomes unnecessary both for the resource object table 407 and resource utilization rate table 410 when a user implements maintenance of a computer, thereby resulting in easy operation of the system.

Fifth Embodiment

A fifth embodiment is on an application of the present invention when a job is in operation (assignment of task application).

In the first embodiment, effects on other tasks are investigated with respect to a target resource for executing a policy action. The present invention also can be applied to securing a resource when a job is in operation.

In the first embodiment, the system includes a procedure for evaluating the effects based on an actual utilization rate when the policy action is executed. However, by using "User-estimated utilization rate" 1206 of "User-defined utilization rate" 1212 in the resource utilization table 410 (refer to FIG. 12), it is also possible to evaluate the effects on other task applications when a resource is determined to assign a job. With the above, a verification measure of effective utilization of a resource also can be obtained when a job is assigned.

Sixth Embodiment

A sixth embodiment is on an adjustment of a sum value of a utilization rate by adjusting a load dispersion balance rate when a scale out is executed as a policy action.

In the first embodiment, in a policy action of a scale out, a calculation of a utilization rate of a sub-resource is made based on a load dispersion balance rate. Depending on a ratio of the load dispersion balance rate, there may be effects on a result of the sum of the utilization rate of each sub-resource, thereby resulting in possibility for executing a policy action.

Therefore, at Step 2403 of the flowchart shown in FIG. 24, with respect to a resource of a policy action target in which a sum value of each sub-resource exceeds 100%, an optimal load dispersion balance rate is obtained by gradually lowering a load dispersion balance rate of the resource of the policy action target by a user instruction (for example, selection of button on screen) so that the sum value of each of the sub-resource does not exceed 100%. Then, the optimal load dispersion balance rate is displayed on a screen, and after confirmation by the user, the load dispersion balance rate obtained by the policy action processing at Step 1809 of the flowchart shown in FIG. 18 is feedbacked.

With the above, the system can provide a method to continue a task service by a policy action, thereby resulting in improvement of the operation rate of the system.

Seventh Embodiment

In the first embodiment, the preferential sub-resource type 1405 is set in the task configuration object attribute table 413

(refer to FIG. 14), and based on a sum value of a utilization rate of the preferential sub-resource type, an additional resource is determined for the policy action at Step 2407 of the flowchart shown in FIG. 24.

If a type of a task is different, a sub-resource which is mainly used may be different depending on the type. Therefore, a selection of a resource, in a processing at Step 2407, which is utilized by a different type of task application or a task configuration object of a different type of task, other than the preferential sub-resource type, can be used as an another measure for determining the priority of the additional resource.

The above purpose can be achieved by setting attribute information which indicates a processing configuration of a task in the task object table 402 (refer to FIG. 9) and task configuration object attribute table 413 (refer to FIG. 14), and by referring to the attributes in a resource determining processing at Step 2407 and resource display order determining processing at Step 2403. The above is also one of methods to continue a task service by a policy action, thereby resulting in improvement of operation rate of the task service.

Eighth Embodiment

So far, when a computer system is selected as a policy action target, the computer system has been selected by evaluating a sum value of a utilization rate of each resource configuring the computer system. In the eighth embodiment, in addition to the above, a network configuration of the computer system on which a task application is operated is also evaluated. The network configuration can be obtained from the task configuration table. For example, when a plurality of policy action targets exist, by selecting a multiplexed computer system which is configured for load dispersion, effects on a task application which shares a resource can be further reduced. Whether or not a system is multiplexed is known from an existence of same task configuration objects by referring to a column of the task configuration object of the task configuration table. This processing is executed in the effected range investigation unit 409, and can be achieved by adding the processing below Step 2308 of the flowchart shown in FIG. 23.

What is claimed is:

1. A resource management system including a plurality of computer systems and providing services through operations of task applications by utilizing resources of the plurality of the computer systems, the resource management system comprising:
a storage which is included in at least one of the computer systems for storing information for identifying the computer systems which execute the task applications, respectively, and resource utilization rate information which includes utilization rates of resources configuring the respective computer systems, wherein the resources are shared by the task applications; and
an effected range investigation unit which is included in at least one of the computer systems and which, responsive to obtaining information that a task application requires additional resources of the computer systems and prior to deciding assignment of the additional resources of a proposed configuration:
obtaining expected utilization rates of the additional resources required by the task application in the proposed configuration, from the resource utilization rate information, and existing utilization rates of the resources which are being used at a time when the additional resources are requested, and
summing the expected utilization rates of the additional resources of the proposed configuration together with the existing utilization rates of the resources which are being used at the time,
wherein the resource management system deciding whether or not to assign the additional resources for the proposed configuration, based at least in part on the sum in verifying effects on other task applications, and
wherein in an event that the resource management system deciding not to assign the additional resources for the proposed configuration as a result of the sum in verifying effects on other task applications, the effected range investigation unit is configured to perform the obtaining and summing, and the resource management system is configured to perform the deciding, for another proposed configuration.

2. The resource management system according to claim 1, further comprising:
a policy control unit in at least one of the computer systems, for changing an assignment of the additional resources for the proposed configuration based on a policy action when the result of the sum in verifying effects on other task applications indicates a utilization rate of the each resource of the computer systems, is equal to or less than a predetermined threshold value and requirements of a Service Level Agreement are achieved, based on the policy action which is included in policy information,
wherein the storage further stores a plurality of policy information which includes the policy action which is information defining a change of the assignment of resources of the computer systems for the task applications.

3. The resource management system according to claim 2, wherein the policy control unit updates information, which is included in the resource utilization rate information, for identifying the computer systems which execute the task applications, respectively, based on the policy action, when the assignment of any resource is changed.

4. The resource management system according to one of claims 1 and 2, further comprising a utilization rate collection unit, in at least one of the computer systems, which updates utilization rates included in the resource utilization rate information by obtaining a utilization rate of each resource of the computer systems.

5. The resource management system according to claim 4, wherein the utilization rate collection unit obtains the utilization rate of the each resource of the computer systems before the effected range investigation unit utilizes the resource utilization rate information.

6. The resource management system according to claim 4, wherein when there is a utilization rate which is larger than the predetermined threshold value with respect to the utilization rate of the each resource of the computer systems in the policy information, the policy control unit selects a policy action which is configured to solve problems to be caused by the utilization rate which is larger than the predetermined threshold value.

7. The resource management system according to claim 4, wherein the resource utilization rate information includes a defined utilization rate of each resource and an obtained utilization rate of each resource obtained by the utilization rate collection unit,
wherein the effected range investigation unit uses the defined utilization rate until a processing number of the system reaches a given number; and uses the obtained utilization rate after the given number.

8. The resource management system according to claim 2, which is configured to sum all utilization rates of each resource of newly configured computer systems by the effected range investigation unit, and evaluates whether or not the all utilization rate are equal to or less than the predetermined value; and obtains information of a network configuration for executing the task applications assigned to the computer systems, then, determines a computer system executing a load dispersion processing as a policy action target.

9. A resource management method including a plurality of computer systems and providing services through operations of task applications by utilizing resources of the plurality of the computer systems, the resource management method comprising:

storing, in a storage which is included in at least one of the computer systems, information for identifying the computer systems which execute the task applications, respectively, and resource utilization rate information which includes utilization rates of resources configuring the respective computer systems, wherein the resources are shared by the task applications; and conducting an effected range investigation by obtaining, responsive to information that a task application requires additional resources of the computer systems and prior to deciding assignment of the additional resources of a proposed configuration:

obtaining expected utilization rates of the additional resources required by the task application in the proposed configuration, from the resource utilization rate information, and existing utilization rates of the resources which are being used at a time when the additional resources are requested, and summing the expected utilization rates of the additional resources of the proposed configuration together with the existing utilization rates of the resources which are being used at the time, deciding whether or not to assign the additional resources for the proposed configuration, based at least in part on the sum in verifying effects on other task applications, and wherein in an event of deciding not to assign the additional resources for the proposed configuration as a result of the sum in verifying effects on other task applications, performing the obtaining, summing, and deciding, for another proposed configuration.

10. The resource management method according to claim 9, further comprising:

storing policy information which includes a policy action which is information defining a change of an assignment of at least one resource of the computer systems for the task applications in the storage of the resource management system, performing the summing for the proposed configuration based on the policy action included in the policy information; and changing the assignment of the additional resources for the proposed configuration based on the policy action when the result of the sum in verifying effects on other task applications indicates a utilization rate of the each resource of the computer systems, is equal to or less than a predetermined threshold value and requirements of a Service Level Agreement are achieved.

11. The resource management method according to claim 10, wherein when there is a change of an assignment of any resource, the resource management method comprises:
updating information, which is included in the resource utilization rate information, for identifying the computer systems now executing the respective task applications based on the task application.

12. The resource management method according to claim 9, wherein the resource management method comprises:
updating a resource utilization rate included in the resource utilization rate information, by obtaining the resource utilization rate of each resource from the computer systems.

13. The resource management method according to claim 12, wherein the resource management method comprises:
obtaining the resource utilization rate of the each resource from the computer systems, before utilizing the resource utilization rate information.

14. The resource management method according to claim 12, wherein when there is a utilization rate which is larger than the predetermined threshold value with respect to the utilization rate of each resource of the computer systems in the policy information, the resource management method comprises:

selecting a policy action configured to solve problems to be caused by the utilization rate which is larger than the predetermined threshold value.

15. The resource management method according to claim 12, wherein the resource management method includes a defined utilization rate of each resource and an obtained utilization rate of each resource in the resource utilization rate information, and the method comprises:

using the defined utilization rate until a processing number of the method reaches a given number; and uses the obtained utilization rate after the given number.

* * * * *